(12) United States Patent
Hara

(10) Patent No.: US 7,085,484 B2
(45) Date of Patent: Aug. 1, 2006

(54) DRIVING DEVICE, POSITION CONTROLLER PROVIDED WITH DRIVING DEVICE, AND CAMERA PROVIDED WITH POSITION CONTROLLER

(75) Inventor: Yoshihiro Hara, Kishiwada (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 10/617,634

(22) Filed: Jul. 11, 2003

(65) Prior Publication Data
US 2004/0013420 A1 Jan. 22, 2004

(30) Foreign Application Priority Data
Jul. 17, 2002 (JP) .............................. 2002-208854

(51) Int. Cl.
G03B 17/00 (2006.01)
H01L 41/04 (2006.01)
(52) U.S. Cl. ..................................... 396/55; 310/316.02
(58) Field of Classification Search ................ 310/314, 310/315, 316.01, 317, 316.02; 396/55; 318/116, 318/135
See application file for complete search history.

(56) References Cited

U.S. PATENT DOCUMENTS

| 5,258,694 A | * | 11/1993 | Ohnishi et al. ............. 318/135 |
| 5,539,268 A | | 7/1996 | Kataoka ..................... 310/316 |
| 5,729,015 A | | 3/1998 | Tong .......................... 250/306 |
| 5,841,215 A | * | 11/1998 | Takeishi ................. 310/316.01 |
| 5,870,634 A | * | 2/1999 | Sugaya et al. ................ 396/52 |
| 6,437,481 B1 | * | 8/2002 | Senda et al. ................ 310/317 |
| 6,512,321 B1 | * | 1/2003 | Yoshida et al. ......... 310/316.01 |
| 6,812,618 B1 | * | 11/2004 | Hayashi ................. 310/316.01 |

FOREIGN PATENT DOCUMENTS

| JP | 5-328757 A | 12/1993 |
| JP | 6-229753 A | 8/1994 |
| JP | 8-201402 A | 8/1996 |
| JP | 2000-78861 A | 3/2000 |
| JP | 2001-078472 A | 3/2001 |

* cited by examiner

Primary Examiner—W. B. Perkey
(74) Attorney, Agent, or Firm—Sidley Austin LLP

(57) ABSTRACT

A driving device for an ultrasonic actuator for driving a movable member is provided with a member sensor for detecting a present position of the movable member, a calculator for calculating a control target position of the movable member, a driving circuit for generating such a drive voltage as to drive the ultrasonic actuator in a specified resonant state, and a control circuit for controlling an operative state of the movable member by adjusting at least one of physical quantities specifying the drive voltage as a maneuverable physical quantity in accordance with a difference between the present position and the control target position so that the movable member pursues the control target position. There can be provided a driving device capable of executing a position servo control while being driven in a specified resonant state, and a position controller and a camera provided with such a driving device.

25 Claims, 13 Drawing Sheets

DRIVE VOLTAGE      D;T1:T2=3:7

PIEZOELECTRIC ELEMENT

DRIVE VOLTAGE      D;T1:T2=7:3

PIEZOELECTRIC ELEMENT

| LOAD [gf] | LOAD [mN] | 4V REVERSE DIRECTION | 4.5V REVERSE DIRECTION | 5V REVERSE DIRECTION |
|---|---|---|---|---|
| 0 | 0 | 19.43 | 24.05 | 28.91 |
| 5.32 | 52.136 | 16.63 | 21.3 | 25.95 |
| 10.32 | 101.136 | 14.02 | 18.54 | 23.16 |
| 15.32 | 150.136 | 10.82 | 14.81 | 19.66 |
| 20.32 | 199.136 | 6.86 | 10.42 | 14.27 |
| 25.32 | 248.136 |  | 6.23 | 10.37 |

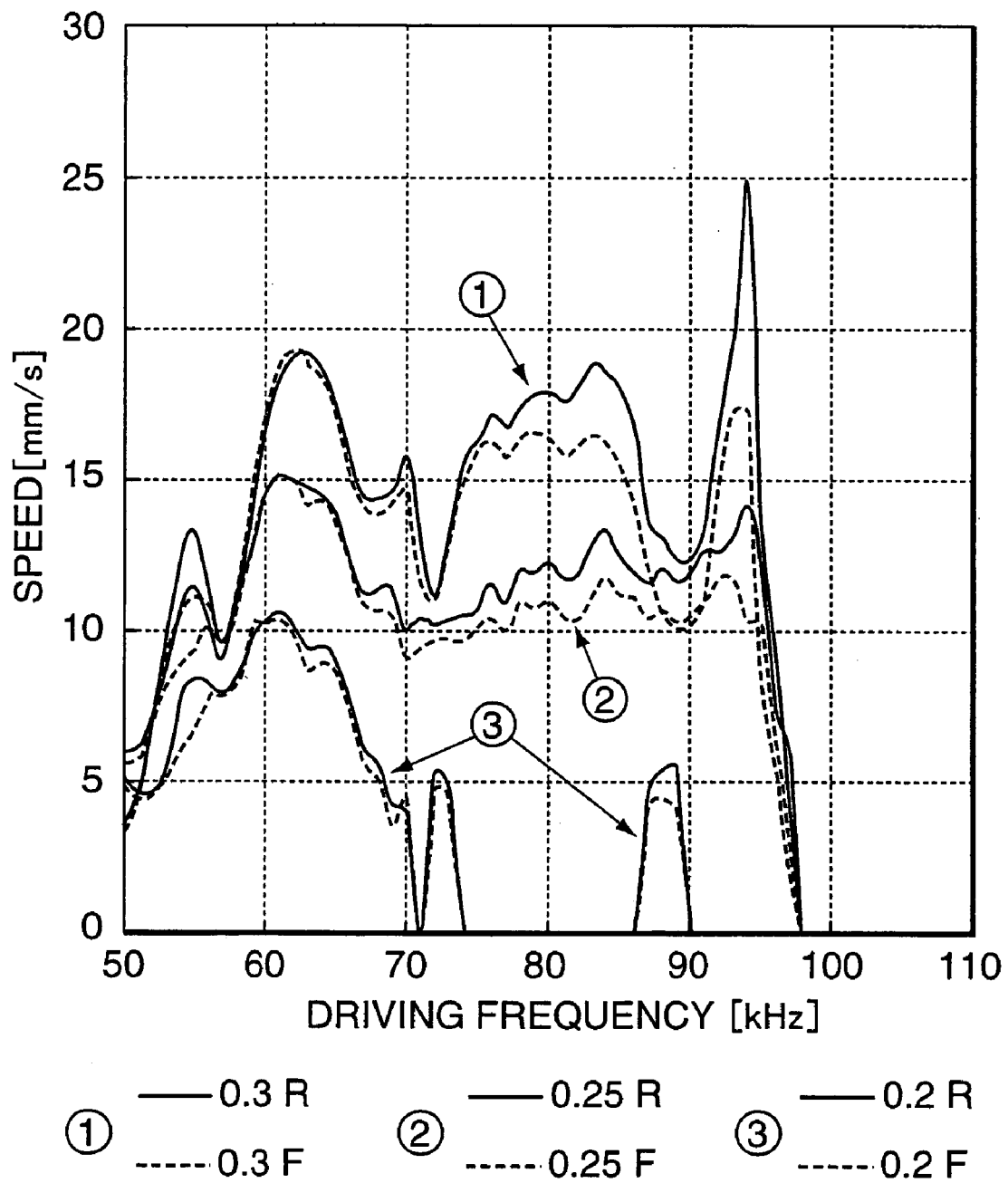

VOLTAGE LOOK-UP TABLE (482)

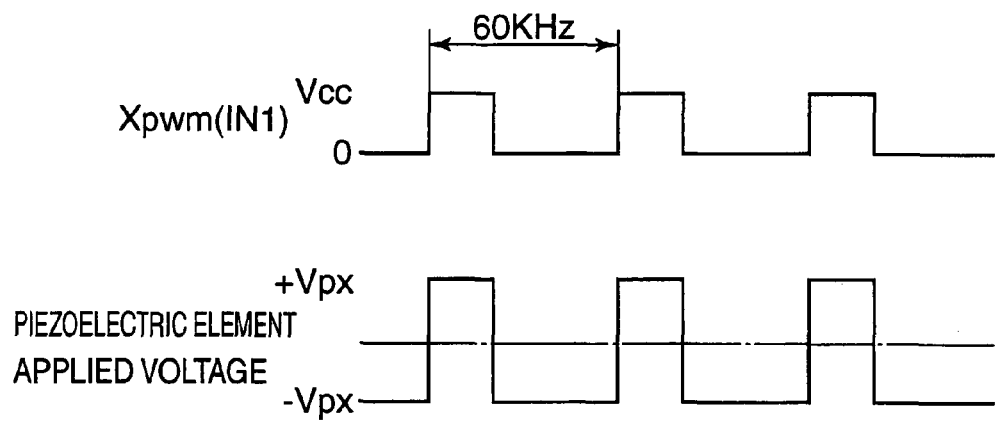
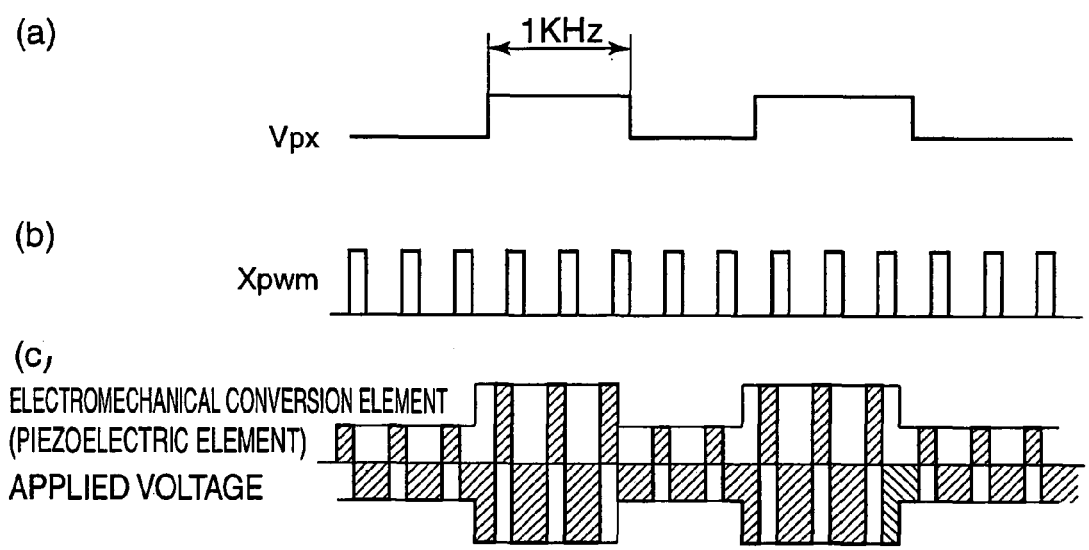

DRIVING DEVICE, POSITION CONTROLLER PROVIDED WITH DRIVING DEVICE, AND CAMERA PROVIDED WITH POSITION CONTROLLER

This application is based on patent application No. 2002-208854 filed in Japan, the contents of which are hereby incorporated by references.

BACKGROUND OF THE INVENTION

This invention relates to a driving device for an ultrasonic actuator, particularly to a driving device capable of a position servo control in an ultrasonic actuator driven in a specified resonant state, and also relates to a position controller provided with a driving device, and a camera provided with a position controller.

In recent years, cameras such as still cameras, digital cameras and camera-integrated VTRs have been required to be smaller and more power-saving for portability and mobility. Thus, driving devices for driving focusing lenses, zoom lenses and camera shake correction lenses have been required to be smaller and more power-saving. Ultrasonic actuators using electromechanical conversion elements have been studied and developed for the use in driving devices to meet this request.

One of the ultrasonic actuators is a piezoelectric actuator constructed such that a movable member having a drivable object to be driven such as a lens mounted thereon is so engaged with a bar-shaped driving member as to have a specified frictional force, and a piezoelectric element is secured to one end of the movable member. In the case of using the thus constructed piezoelectric actuator to drive a focusing lens, a zoom lens, a camera shake correction lens or the like, operative states such as the position, speed and acceleration of the movable member need to be controlled for precise focusing, magnification adjustment and camera shake correction. Particularly, in the case of driving the camera shake correction lens, camera shake needs to be continuously corrected during a specified period, e.g., a period lasting until an exposure is completed after a release button is fully pressed. Thus, it is particularly important to servo-control the position of the movable member so as to pursue a continuously changing target position with a minimum deviation.

A driving device for controlling an ultrasonic motor as one of the ultrasonic actuators is disclosed in Japanese Unexamined Patent Publication No. 2001-078472. However, the driving device disclosed in this publication controls the frequency while detecting a phase difference so that a disk-shaped ultrasonic motor can be constantly driven at a mechanical resonance frequency and is not intended to control the position of a vibrating body which corresponds to the movable member.

Further, Japanese Unexamined Patent Publication No. 8-201402 discloses a position control system for a scan-type probe microscope which system controls the position of a probe using a piezoelectric actuator to drive the probe. However, the piezoelectric actuator disclosed in this publication is, according to Japanese Unexamined Patent Publication No. 6-229753, constructed such that a single common electrode is provided on the inner circumferential surface of a tubular piezoelectric element while four drive electrodes are circumferentially provided on the outer circumferential surface thereof, voltages applied to the four drive electrodes are suitably controlled to three-dimensionally displace a free end of the piezoelectric element by bending, elongating and shrinking. A stage is secured to the free end of this piezoelectric element and a sample is mounted on this stage, whereby the sample is scanned by a probe by the displacement of the free end of the piezoelectric element. Accordingly, the position control system for the piezoelectric actuator disclosed in the above publication is for controllably moving the probe to a desired position, but not for servo-controlling the position of the probe. Nor is this system for controlling the position using a resonant state.

A driving circuit for suitably controlling the speed, acceleration and the like upon the position servo in such a state where the ultrasonic actuator is driven in the specified resonant state has not been known as described above. Thus, there has been a demand for a driving device capable of a position servo control in the case that the position of a drivable object needs to be controllably adjusted to a continuously changing control target position.

SUMMARY OF THE INVENTION

It is an object of the present invention to provide a driving device, a position controller, and a camera which are free of the problems residing in the prior art.

It is another object of the present invention to provide a driving device for an ultrasonic actuator which can perform a position servo control.

It is still another object of the present invention to provide a position controller and a camera which can utilize such position servo control.

According to an aspect of the present invention, an ultrasonic actuator is driven by a driving device to drive a movable member. The driving device is provided with a position detector for detecting a present position of the movable member driven by the ultrasonic actuator, a calculator for calculating a control target position of the movable member, a driver for generating such a drive voltage to drive the ultrasonic actuator in a specified resonant state, and a controller for controlling an operative state of the movable member by adjusting at least one of physical quantities specifying the drive voltage as a maneuverable physical quantity in accordance with a difference between the present position and the control target position so that the movable member pursues the control target position.

According to another aspect of the present invention, such a driving device may be used with an ultrasonic actuator for driving a camera shake correction lens.

These and other objects, features and advantages of the present invention will become more apparent upon reading the following detailed description along with the accompanying drawings.

BRIEF DESCRIPTION OF THE DRAWINGS

FIG. 7 is a graph showing driving frequency-speed characteristics;

FIGS. 14A, 14B(a) to 14B(c) are diagrams showing a relationship of a voltage Vpx (Vp for driving in X-direction) applied to an X-direction driving actuator, a PWM pulse Xpwm for driving the X-direction driving actuator, and a voltage actually applied to the electromechanical conversion element.

DETAILED DESCRIPTION OF THE PREFERRED EMBODIMENTS OF THE INVENTION

Figure 1:
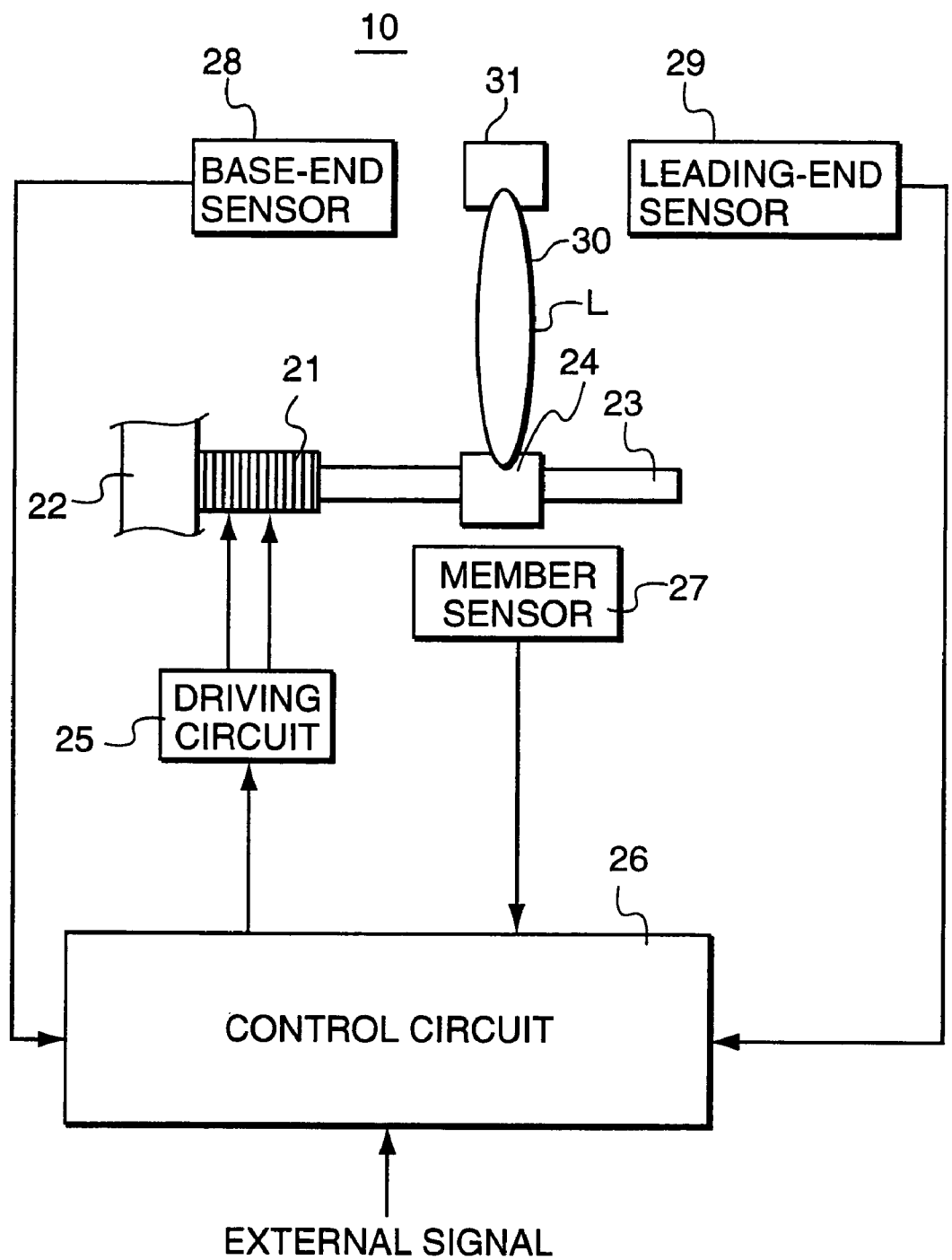
FIG. 1 is a block diagram schematically showing a construction of a driving device according to an embodiment of the present invention.

Hereinafter, embodiments of the present invention are described with reference to the accompanying drawings. It should be noted that no description is given on the same construction by identifying it by the same reference numerals in the respective drawings.

Figure 2:
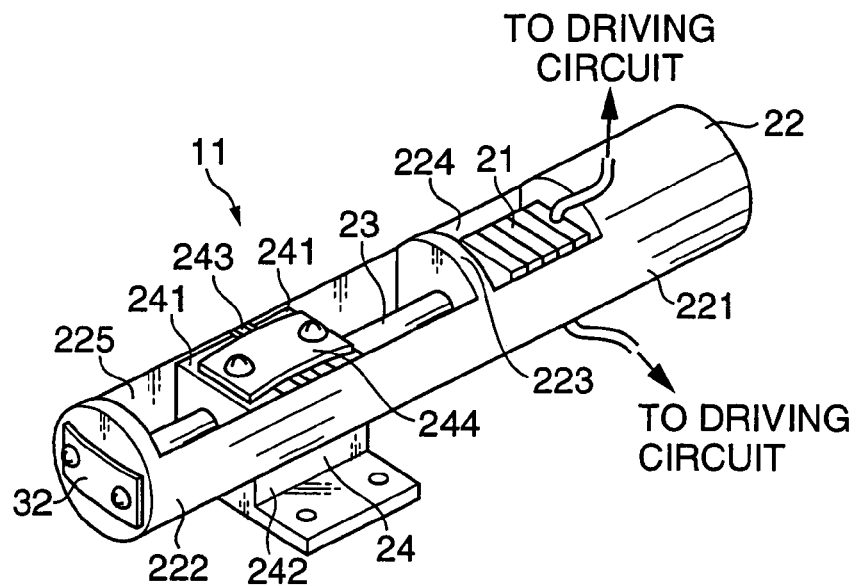
FIG. 2 is a perspective view showing an impact-type piezoelectric actuator used in the driving device.

Referring to FIGS. 1 and 2 showing a construction of a driving device according to an embodiment is described, a driving device 10 is provided with an electromechanical conversion element 21, a supporting member 22, a driving member 23, a movable member 24, a driving circuit 25, a control circuit 26, a member sensor 27, a base-end sensor 28 and a leading-end sensor 29. An impact-type piezoelectric actuator 11 includes the electromechanical conversion element 21, the supporting member 22, the driving member 23 and the movable member 24.

The supporting member 22 is a part for holding the electromechanical conversion element 21 and the driving member 23 and is formed with first and second accommodating spaces 224, 225 by having the inside thereof hollowed while leaving opposite longitudinal ends 221, 222 of a cylindrical body and a partition wall 223 located substantially in the middle. The electromechanical conversion element 21 is accommodated in the first accommodating space 224 such that the elongating direction thereof, i.e., the polarizing direction thereof, coincides with the longitudinal direction of the supporting member 22. A part of the movable member 24 and the driving member 23 are accommodated in the second accommodating space 225.

The electromechanical conversion element 21 is a multi-layered piezoelectric element formed by placing a plurality of piezoelectric substrates having a specified thickness with an electrode provided between adjacent piezoelectric substrates, and elongates and shrinks in layered direction. Such a multi-layered piezoelectric element has a higher resonance frequency because of its higher elastic stiffness as compared to a bimorph element and, accordingly, has an advantageous effect of a quick response speed. This multi-layered piezoelectric element has another advantageous effect that a generating force is incommensurably larger as compared to the bimorph element. The thickness of the piezoelectric substrate is determined by the necessary elongation rate, number of layers, and applied voltage based on specification.

The electromechanical conversion element 21 has one end surface thereof along a longitudinal direction, which is the elongating direction, secured to one end surface (end surface toward the end 221) of the first accommodating space 224. The other end 222 and the partition wall 223 of the supporting member 22 are formed at their middle positions with holes having a shape in conformity with the cross section of the driving member 23. The bar-shaped driving member 23 is so accommodated in the second accommodating space 225 through these two holes as to be movable along longitudinal direction. The other end surface of the electromechanical conversion element 21 is secured to an end of the driving member 23 projecting into the first accommodating space 224.

An end of the driving member 23 projecting out of the second accommodating space 225 is biased toward the electromechanical conversion element 21 at a specified spring pressure by a leaf spring 32. The biasing of the leaf spring 32 is for stabilizing the displacement of the driving member 23 along longitudinal direction resulting from the elongating and shrinking motions of the electromechanical conversion element 21.

The driving member 23 is a guide for translating the elongating and shrinking motions of the electromechanical conversion element 21 into movements of the movable member 24 and supporting the movable member 24. The cross section of the driving member 23 may take a circular, elliptical, rectangular or like shape. In order to stably support and smoothly move the movable member 24, the driving member 23 has a circular cross section in this embodiment.

The movable member 24 includes a base portion 242 having mounting portions 241 at its opposite ends along the longitudinal direction of the driving member 23, and a squeezing member 243 fitted between the mounting portions 241. The base portion 242 is loosely fitted on the driving member 23. The squeezing member 243 is pressed in a direction toward the driving member 23 by a leaf spring 244 mounted on the mounting portions 241, and held in contact with the driving member 23. The movable member 24 is coupled to the driving member 23 with a specified frictional force by this contact. A drivable object 30 to be driven is mounted using the mounting portions 241 of this movable member 24. An auxiliary supporting member 31 for supporting the drivable object 30 is mounted at a position opposed to the position where the drivable object 30 is mounted on the mounting portions 241. This auxiliary supporting member 31 makes the drivable object 30 movable along a direction substantially vertical to the longitudinal direction of the driving member 23.

The drivable object 30 differs depending on an apparatus in which the driving device of this embodiment is installed. For example, the drivable object 30 is a focusing lens, a zoom lens and a camera shake correction lens in the case that the apparatus is a camera; it is a projection lens in the case that the apparatus is an overhead projector; and it is a moving stage in the case that the apparatus is an XY moving stage. In the case that the drivable object 30 needs to be moved in two X-, Y-directions such as the cases of the camera shake correction lens and the XY moving stage, the driving device is arranged for each direction. The apparatus in which the driving device of this embodiment is installed are not limited to these. This driving device 10 can be suitably used because of its characteristics in the case that the drivable object 30 needs to be continuously moved to a target position within a specified period.

The driving circuit 25 is a circuit for generating a drive voltage to be applied to the electromechanical conversion element 21, and the amplitude and frequency of the drive voltage, and a duty ratio D of the drive voltage if the drive voltage is a rectangular wave are controlled by the control circuit 26.

Figure 3:
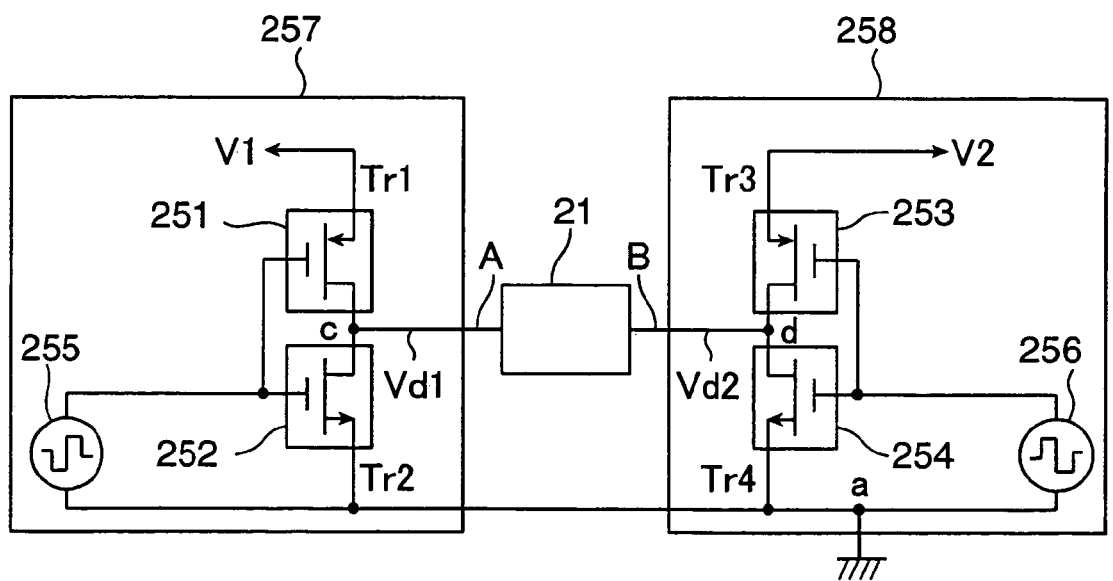
FIG. 3 is a circuit diagram showing one exemplary construction of a driving circuit of the driving device.

FIG. 3 is a circuit diagram showing a construction of the driving circuit 25. This driving circuit 25 is an H-bridge circuit and is comprised of a first driving circuit 257 and a second driving circuit 258. The first driving circuit 257 includes a first switching circuit 251 formed by a switching element Tr1, a second switching circuit 252 formed by a switching element Tr2, a dc supply voltage V1 from a power supply (not shown), and a waveform generator 255 for generating a voltage of a specified waveform. The second driving circuit 258 includes a third switching circuit 253 formed by a switching element Tr3, a fourth switching circuit 254 formed by a switching element Tr4, a dc supply voltage V2 from a power supply (not shown), and a waveform generator 256 for generating a voltage of a specified waveform. The respective switching elements Tr1 to Tr4 are enhancement mode MOSFETs (Metal Oxide Semiconductor Field Effect Transistors).

The first driving circuit 257 is constructed such that the dc supply voltage V1 is supplied to a source electrode of the switching element Tr1, and the first and second switching circuits 251, 252 are connected in series between the supply voltage V1 and a grounded node "a". The second driving circuit 258 is constructed such that the dc supply voltage V2 is supplied to a source electrode of the switching element Tr3, and the third and fourth switching circuits 253, 254 are connected in series between the supply voltage V2 and the grounded node "a".

The switching element Tr1 of the first switching circuit 251 and the switching element Tr3 of the third switching circuit 253 are p-channel FETs. Thus, the switching elements Tr1, Tr3 are on (closed) when a drive control signal is at low level (L-level). The switching element Tr2 of the second switching circuit 252 and the switching element Tr4 of the fourth switching circuit 254 are n-channel FETs. Thus, the switching elements Tr2, Tr4 are on (closed) when the drive control signal is at high level (H-level).

The electromechanical conversion element 21 is connected between a node "c" of the first and second switching circuits 251 and 252 and a node "d" of the third and fourth switching circuits 253, 254, thereby constructing the H-bridge circuit.

A first drive signal Sd1 outputted from the waveform generator 255 is applied to gate electrodes of the first and second switching elements Tr1, Tr2, and a second drive signal Sd2 outputted from the waveform generator 256 is applied to gate electrodes of the third and fourth switching elements Tr3, Tr4. The first and second drive signals Sd1, Sd2 are rectangular-wave signals having a specified duty ratio D.

The dc supply voltages V1, V2 are values for determining the intensity (amplitude) of the rectangular-wave drive voltage to be applied to the electromechanical conversion element 21. The dc supply voltage V1 becomes a first drive voltage Vd1 corresponding to the first drive signal Sd1, whereas the dc supply voltage V2 becomes a second drive voltage Vd2 corresponding to the second drive signal Sd2. The first and second drive voltages Vd1, Vd2 are voltages having phases opposite from those of the first and second drive signals Sd1, Sd2 and are applied to the electromechanical conversion element 21, respectively.

In order to make the driving circuit 25 less expensive and smaller, a single power supply may be commonly used by setting the dc supply voltages V1, V2 such that V1=V2=Vp.

Referring back to FIG. 1, the member sensor 27 is arranged within a movable range of the movable member 24 and is formed by a sensor such as a MRE (MagnetoResistive Effect) device and a PSD (Position Sensitive Device). The present position of the movable member 24 is detected by the member sensor 27, enabling a control of moving the movable member 24 to a control target position. The base-end sensor 28 and the leading-end sensor 29 are formed by sensors such as photointerrupters, and arranged at such positions as to prevent the movable member 24 from moving beyond the movable range.

The control circuit 26 is a circuit for controlling the entire driving device 10 and includes a central processing unit (hereinafter, "CPU") for performing arithmetic operations, a ROM (read-only memory) storing an operation program and data, and a RAM (Random Access Memory) for temporarily saving data. Particularly, a look-up table or adjustment value table defining a relationship between a basic driving frequency of the drive voltage, the moving speed of the movable member 24 and maneuverable physical quantities which specify the drive voltage and serve as maneuverable quantities is stored in the ROM. The look-up table is generated by a method to be described later for each physical quantity of the drive voltage controlled as a maneuverable quantity. For example, if the maneuverable quantity is a voltage value, a voltage look-up table defining a relationship between the moving speed of the movable member 24 and the voltage value of the drive voltage is generated; if the maneuverable quantity is a frequency, a frequency look-up table defining a relationship between the moving speed of the movable member 24 and the frequency of the drive voltage is generated; and if the drive voltage is a rectangular-wave voltage and the maneuverable quantity is the duty ratio D, a duty ratio look-up table defining a relationship between the moving speed of the movable member 24 and the duty ratio D of the drive voltage is generated. At least one of these look-up tables is stored in the ROM. A plurality of look-up tables may be stored and suitably switched.

An external signal instructing the operation of the driving circuit 25 to move the movable member 24 to a desired position at a desired speed and detection outputs of the member sensor 27, the base-end sensor 28 and the leading-end sensor 29 are inputted to the control circuit 26, which in turn determines the moving speed based on these inputs with reference to the look-up table and outputs control signals to the waveform generators 255, 256 of the driving circuit 25 so that the movable member 24 can be moved to the instructed position at the determined moving speed.

The driving principle of the driving device 10 is first described before a method for determining the basic driving frequency and the method for generating the look-up table are described.

Figure 4A:
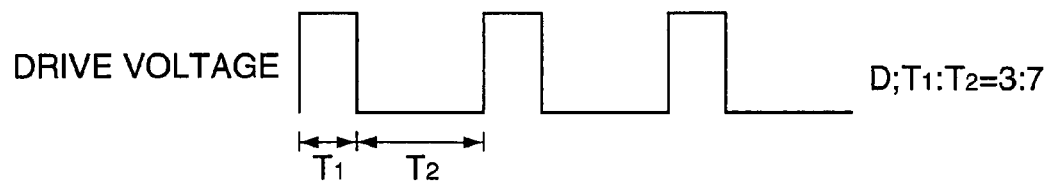
FIGS. 4A to 4D are charts showing the driving principle of the driving device.
Figure 4B:
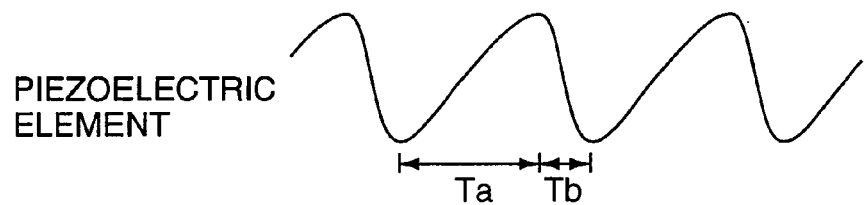
Figure 4C:
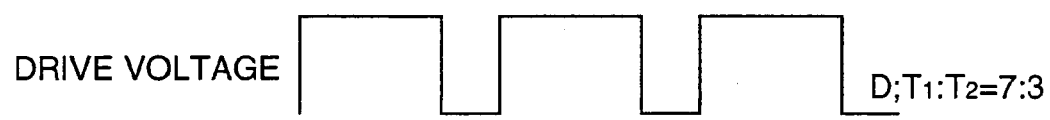
Figure 4D:
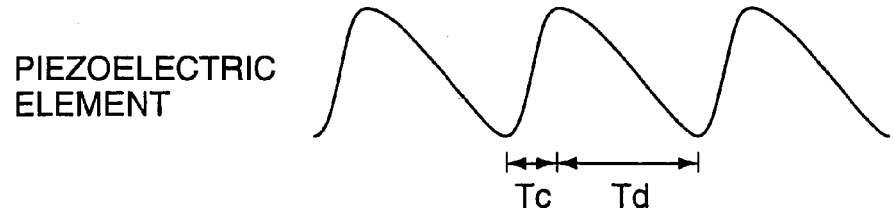

FIGS. 4A to 4D are charts showing the driving principle of the driving device. FIG. 4A shows a waveform of the drive voltage outputted from the driving circuit 25 to the electromechanical conversion element 21 in the case that the movable member 24 is moved in the forward direction. FIG. 4B shows a displacement of the electromechanical conversion element 21 resulting from its elongating and shrinking motions corresponding to the drive voltage of FIG. 4A. FIG. 4C shows a voltage waveform of the drive voltage outputted from the driving circuit 25 to the electromechanical conversion element 21 in the case that the movable member 24 is moved in the reverse direction. FIG. 4D shows a displacement of the electromechanical conversion element 21 resulting from its elongating and shrinking motions corresponding to the drive voltage of FIG. 4C.

Here, the forward direction is a direction in which the movable member 24 is moved from the electromechanical conversion element 21 toward the leading end of the driving member 23 (end biased by the leaf spring 32), and the reverse direction is, conversely, a direction in which the movable member 24 is moved from this leading end of the driving member 23 toward the electromechanical conversion element 21. The displacements of the electromechanical conversion element 21 resulting from its elongating and shrinking motions were measured by a laser Doppler vibrometer.

In the case that a rectangular-wave drive voltage having the duty ratio D of 3:7 as shown in FIG. 4A is applied to the electromechanical conversion element 21, the displacement of the electromechanical conversion element 21 was confirmed to take a serrated trail having moderately sloped-up portions Ta and steeply sloped-down portions Tb as shown in FIG. 4B. On the other hand, in the case that a rectangular-wave drive voltage having the duty ratio D of 7:3 as shown in FIG. 4C is applied to the electromechanical conversion element 21, the displacement of the electromechanical conversion element 21 as shown in FIG. 4D was confirmed to take a serrated trail having steeply sloped-up portions Tc and moderately sloped-down portions Td.

Specifically, while the displacement of the electromechanical conversion element 21 follows the moderately sloped-up portion Ta as shown in FIG. 4B, the electromechanical conversion element 21 moderately elongates and the movable member 24 is moved in the forward direction together with the driving member 23. While the displacement of the electromechanical conversion element 21 follows the steeply sloped-down portion Tb as shown in FIG. 4B, the electromechanical conversion element 21 suddenly shrinks and the movable member 24 remains substantially at the same position by slipping on the driving member 23 even if the driving member 23 is moved in the reverse direction. This corresponds to a forward movement of the movable member 24. Thus, the movable member 24 is intermittently moved in the forward direction by repeatedly applying the rectangular-wave drive voltage shown in FIG. 4A to the electromechanical conversion element 21. The same holds for the moving principle in the reverse direction.

Here, it is not always necessary to set the movable member 24 and the driving member 23 in non-slipping states even at the moderately sloped-up portion Ta. If a value obtained by subtracting a reverse moving amount of the movable member 24 moving in the reverse direction at the steeply sloped-down portion Tb from a forward moving amount of the movable member 24 moving in the forward direction at the moderately sloped-up portion Ta is larger than 0, this results in a forward movement of the movable member 24. Since the inclinations of the moderately sloped-up portion Ta and the steeply sloped-down portion Tb change as the duty ratio D of the drive voltage changes, the forward moving amount and the reverse moving amount depend on a change in the duty ratio D of the drive voltage. Thus, the duty ratio D of the drive voltage may be set such that (forward moving amount)−(reverse moving amount)>0 in order to move the movable member 24 in the forward direction. Not only in the case that the drive voltage is a rectangular wave, but also in the case that it is a sine wave, the aforementioned serrated trail has been confirmed to be realizable.

The duty ratio D is T1:T2 if T1, T2 denote a period during which the rectangular wave is at high level and a period during which it is at low level, respectively.

For example, in the case that the drive voltage shown in FIG. 4A is applied to the electromechanical conversion element 21, the electromechanical conversion element 21 is displaced in a serrated manner for the following reason. The rectangular wave is comprised of a sine wave as a basic wave and harmonics of second or higher order. If a driving frequency fd of the drive voltage is larger than 0.3 times and smaller than 1.5 times as high as a resonance frequency fr of the electromechanical conversion element 21 (0.3× fr<fd<1.5×fr), gains of the harmonics of third or higher order among the high order harmonics forming the rectangular wave are largely attenuated upon being influenced by the resonance frequency fr of the electromechanical conversion element 21 in the system, and the drive voltage applied to the electromechanical conversion element 21 comes to take a waveform (serrated waveform) substantially comprised of the basic wave and the second order harmonic. The displacement of the electromechanical conversion element 21 having basic wave components and second order harmonic components can be obtained by the Fourier inverse transform and takes a serrated trail.

On the other hand, the moving direction of the movable member 24 is reversed at a certain value of the duty ratio D of the drive voltage because the phase of the second order harmonic is shifted with respect to the basic wave at this duty ratio D, whereby the inclinations of the sloped-up portion Ta (Tc) and the sloped-down portion Tb (Td) in the serrated trail comprised of the basic wave and the second order harmonic change. In other words, the movable member 24 is moved in the forward direction if 0.05<D<0.45 while being moved in the reverse direction if 0.55<D<0.95.

Here, the resonance frequency fr of the electromechanical conversion element 21 in a state where the supporting member 22 and the driving member 23 are secured is obtained by following Equation (1).

$$fr = \frac{fr0}{2}\sqrt{\frac{mp}{mp + 2mf}} \quad (1)$$

where fr0, mp and mf in Equation (1) denote a free resonance frequency (resonance frequency in an inter-electrode direction of the electromechanical conversion element 21 itself) between the two electrodes of the electromechanical conversion element 21; the mass of the electromechanical conversion element 21; and the mass of the driving member 23. Although the mass of the supporting member 22 is related to the resonance frequency fr of the electromechanical conversion element 21 in the resonance system, it is sufficiently larger than a sum of the masses of the electromechanical conversion element 21 and the driving member 23 and gives only a little influence on the resonance frequency fr. Thus, the mass of the supporting member 22 needs not be considered as an operation parameter. Further, the movable member 24 is not included as an operation parameter of Equation (1) since it slips on the driving member 23 during the resonance of the electromechanical conversion element 21 and needs not be considered as an element of the resonance system.

The relationship between the resonance frequency fr and the driving frequency fd at which the movable member 24 is movable (0.3×fr<fd<1.5×fr) and the relationship between the resonance frequency fr and the moving direction were confirmed by experiments and were disclosed together with the driving principle of the driving device 10 in Japanese Unexamined Patent Publication No. 2001-211669 by the same applicant as the present application.

The following analysis was made based on the above basic viewpoint to obtain the basic driving frequency and the respective look-up tables.

(Determination of the Basic Driving Frequency)

First, a characteristic of a change in the speed in relation to a change in the driving frequency was studied.

Figure 5:
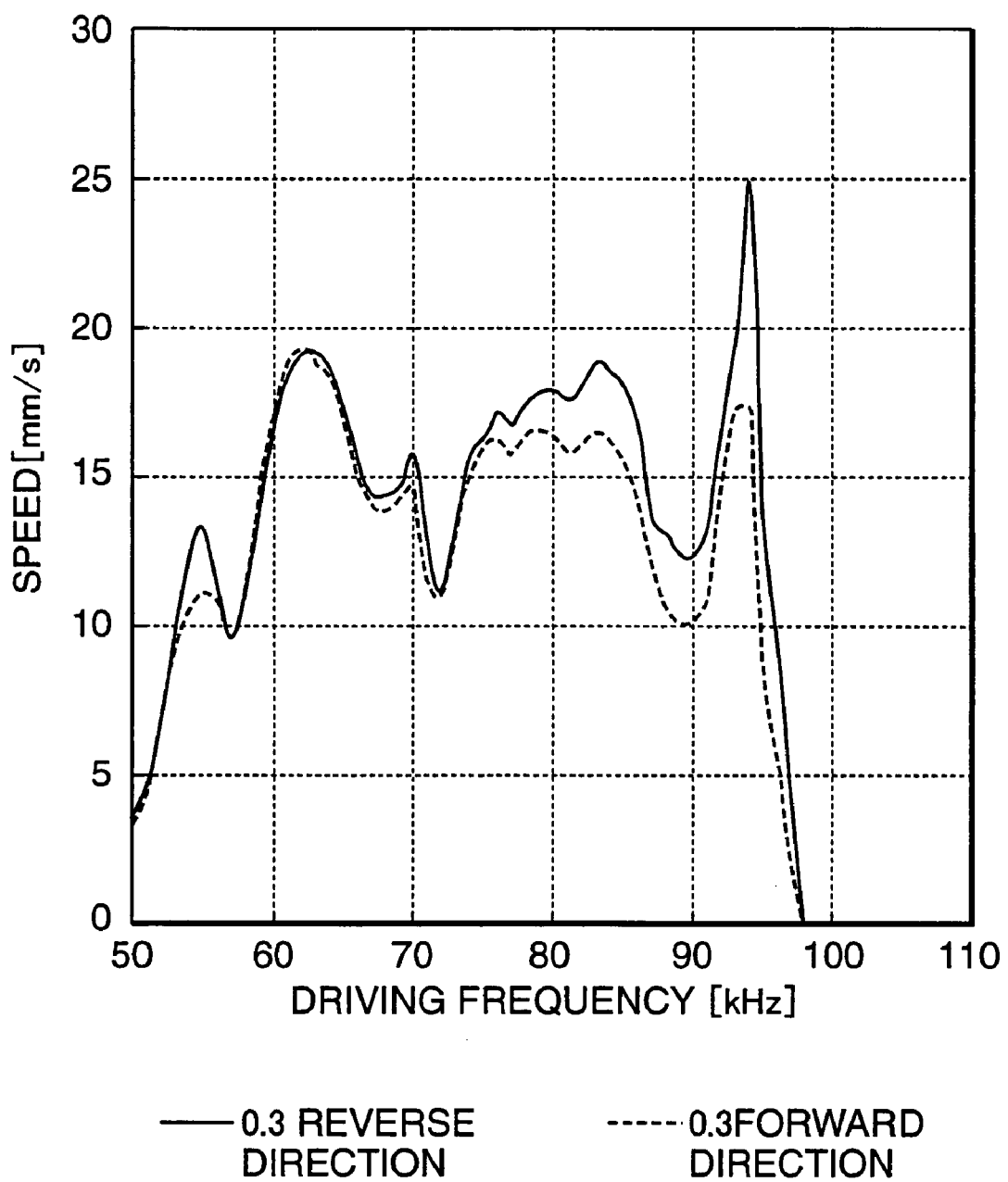
FIG. 5 is a graph showing driving frequency-speed characteristics.

FIG. 5 is a graph showing driving frequency-speed characteristics. In FIG. 5, horizontal axis represents the driving frequency of the drive voltage in kHz and vertical axis represents the moving speed of the movable member 24 in mm/s.

This analysis was made to study the moving speed of the movable member 24 in the forward and reverse directions when the driving frequency is varied from 50 kHz to 100 kHz. The drive voltage was a rectangular wave having the duty ratio D of 3:7 in the case of the forward direction while being a rectangular wave having the duty ratio D of 7:3 in the case of the reverse direction. The moving speed was calculated as an average speed by measuring a time required to move a specified distance. In FIG. 5, the moving speed in the case of the forward direction is shown by broken line and the one in the case of the reverse direction is shown by solid line.

As can be seen from FIG. 5, the driving device 10 used in this analysis can drive the movable member 24 at the driving frequency at least between 50 kHz and about 97 kHz. The moving speed of the movable member 24 changes while taking a substantially trapezoidal trace as the driving frequency changes from 50 kHz to 100 kHz and the resonant state and the nonresonant state are present during this period. Specifically, the movable member 24 is moved at the speed of about 3.5 mm/s at the driving frequency of 50 kHz, enters the resonant state at the driving frequency of about 55 kHz to move at the speed of about 11.0 mm/s. Then, the movable member 24 enters the nonresonant state at the driving frequency of about 57 kHz to decelerate its moving speed to about 9.5 mm/s. Thereafter, the movable member 24 enters the resonant state at the driving frequency of about 62.5 kHz to accelerate its moving speed to about 19.3 mm/s. The moving speed is substantially constant at about 14.0 mm/s while the driving frequency changes from about 65 kHz to about 69 kHz and then reaches a small peak at the driving frequency of about 70 kHz. The movable member 24 enters the nonresonant state at the driving frequency of about 72 kHz to decelerate its moving speed to about 11.4 mm/s. Then, the moving speed is accelerated to about 16.0 mm/s up to the driving frequency of about 75 kHz. Thereafter, the moving speed is constant at about 16.0 mm/s, despite a small variation, up to the driving frequency of about 85 kHz. The movable member 24 enters the nonresonance state at the driving frequency of about 89.8 kHz to decelerate its moving speed to about 10 kHz mm/s. Then, the movable member 24 enters the resonant state at the driving frequency of about 93.5 kHz to accelerate its moving speed to about 17.5 mm/s, and the moving speed becomes 0 mm/s at the driving frequency of about 98 kHz. The change of the moving speed in relation to the driving frequency is substantially same in the forward and reverse directions although the moving speed is faster in the reverse direction than in the forward direction.

As shown in FIG. 5, the moving speed of the movable member 24 is substantially constant at about 14.0 mm/s and about 16.0 mm/s while the driving frequency changes from about 65 kHz to about 69 kHz and from about 75 kHz to about 85 kHz. Accordingly, if the driving device 10 is operated, for example, in a driving frequency range of about 65 kHz to about 69 kHz and in a driving frequency range of about 75 kHz to about 85 kHz, the driving device 10 can move the movable member 24 at a speed stable against the variation of the driving frequency.

On the other hand, as can be seen from FIG. 5, the moving speed changes substantially linearly in relation to the driving frequency between the driving frequency in the resonant state and the driving frequency in the nonresonant state. Particularly, the moving speed changes substantially linearly in the substantially same manner in the forward and reverse directions between about 57 kHz and about 62.5 kHz.

As can be seen from FIG. 5, if an attempt is made to drive the driving device 10 of this embodiment at the resonance frequency set as the basic driving frequency, the moving speed of the movable member 24 largely changes in relation to a small variation of the driving frequency. Particularly, if the driving device 10 is driven at about 93.5 kHz which is the resonance frequency, the moving speed of the movable member 24 largely varies from about 25 mm/s to about 20 mm/s when the driving frequency is changed to about 92.5 kHz while largely varying from about 25 mm/s to about 15 mm/s when the driving frequency is changed to about 94.5 kHz.

Accordingly, the basic driving frequency is so set as to drive the driving device 10 at a frequency deviated from a complete resonance frequency in this embodiment of the present invention. For example, the basic driving frequency is set at 60 kHz, 68 kHz or 80 kHz. Particularly, as can be seen from FIG. 5, if the basic driving frequency is set between about 65 kHz and about 69 kHz and between about 75 kHz and about 85 kHz, the movable member 24 can be moved at a speed stable (with a little speed variation) against the variation of the driving frequency. Therefore, such a basic driving frequency is suitable.

Here, the basic driving frequency is a frequency of the drive voltage necessary to obtain the moving speed of the movable member 24 determined by the specification of an apparatus in which the driving device 10 is installed under conditions of a specific drivable object, a specific temperature, a specific drive voltage value, and a specific duty ratio of the drive voltage in the case of a rectangular wave.

(Generation of the Voltage Look-Up Table)

Next, a characteristic of a change in the speed in relation to a change in the load of a movable part was studied by changing the voltage value of the drive voltage. In this case as well, the drive voltage was a rectangular wave having the duty ratio D of 3:7 in the case of the forward direction while being a rectangular wave having the duty ratio D of 7:3 in the case of the reverse direction.

Figures 6A, 6B:
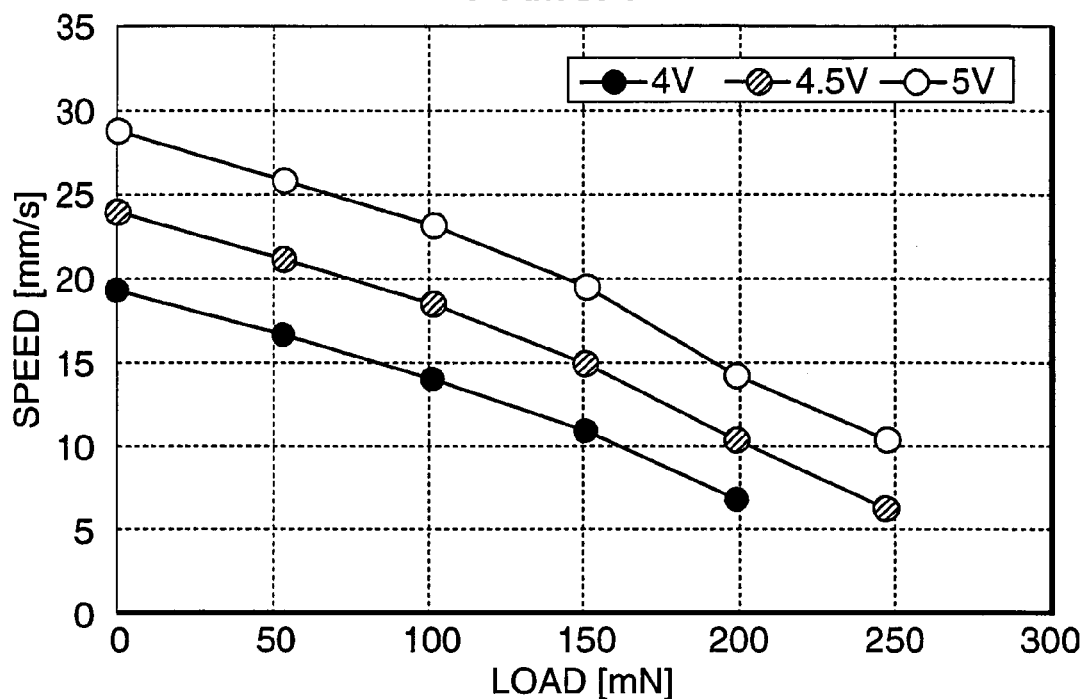
FIG. 6A is a graph showing load-speed characteristics of a movable part.
FIG. 6B is a table showing load-speed characteristics of the movable part.

FIGS. 6A and 6B show movable part load-speed characteristics. FIG. 6A is a graph in which horizontal axis represents load in mN and vertical axis represents speed in mm/s, whereas FIG. 6B is table showing measurement values. The movable part load is an entire load exerted on the driving device 10, for example, when a drivable object such as a camera shake correction lens is mounted on the movable member 24. Although FIG. 6 shows the measurement values when the movable member 24 is moved in the reverse direction, the same result can be obtained when the movable member 24 is moved in the forward direction.

As can be seen from FIG. 6, the moving speed of the movable member 24 changes substantially linearly in relation to the movable part load at the respective drive voltages of 4 V, 4.5 V and 5 V. Specifically, at the driving voltage of 4 V, the moving speed changes substantially linearly from about 19.4 mm/s to about 6.86 mm/s as the movable part load changes from 0 mN to about 200 mN. At the driving voltage of 4.5 V, the moving speed changes substantially linearly from about 24.0 mm/s to about 6.23 mm/s as the movable part load changes from 0 mN to about 250 mN. At the driving voltage of 5 V, the moving speed changes substantially linearly from about 28.9 mm/s to about 10.4 mm/s as the movable part load changes from 0 mN to about 250 mN. The moving part load-speed characteristics at the respective voltages are substantially parallel to each other. In other words, the moving speed can be changed by changing the voltage value in the case that the drivable object 30 is mounted on the movable member 24 to obtain a specified load condition.

Accordingly, the voltage look-up table can be generated by mounting the drivable object 30 on the movable member 24 to obtain the specified load condition and actually measuring a relationship between the moving speed of the movable member 24 and the voltage value of the drive voltage. For example, in the case that the load is about 101.1 mN, the voltage look-up table is generated such that (14.0 mm/s, 4 V), (18.5 mm/s, 4.5 V) and (23.2 mm/s, 5 V) if it is written in (speed, voltage value).

(Generation of the Duty Ratio Look-Up Table)

Next, with the movable part load set constant, a characteristic of a change in the speed in relation to a change in the driving frequency was studied by changing the duty ratio of the drive voltage.

FIG. 7 is a graph showing driving frequency-speed characteristics. In FIG. 7, horizontal axis represents the driving frequency of the drive voltage in kHz and vertical axis represents the moving speed of the movable member 24 in mm/s. Further, the moving speed in the case of the forward direction is shown by broken line and the one in the case of the reverse direction is shown by solid line. The characteristics of the change in the speed in relation to the change in the driving frequency were studied for the respective cases where the duty ratio D of the drive voltage is 3:7 (① in FIG. 7), 2.5:7.5 (② in FIG. 7) and 2:8 (③ in FIG. 7).

No description is given on the change in the moving speed of the movable member 24 when the duty ratio D is 3:7 in FIG. 7 since it is the same as described with reference to FIG. 5.

The case where the duty ratio D is 2.5:7.5 is described. As can be seen from FIG. 7, the driving frequency-speed characteristic at the duty ratio of 2.5:7.5 takes the substantially same profile as the one at the duty ratio of 3:7. However, in this case, the resonance state and the nonresonance state are unclear as compared to the case at the duty ratio of 3:7. Specifically, the driving device 10 used in this analysis can drive the movable member 24 at the driving frequency at least between 50 kHz and about 97 kHz. The moving speed of the movable member 24 changes while taking a substantially trapezoidal trace as the driving frequency changes from 50 kHz to 100 kHz and the resonant state and the nonresonant state are present during this period. The movable member 24 is moved at the speed of about 5.0 mm/s at the driving frequency of 50 kHz, enters the resonant state at the driving frequency of about 55 kHz to move at the speed of about 8.4 mm/s. Then, the movable member 24 enters the nonresonant state at the driving frequency of about 57 kHz to decelerate its moving speed to about 7.0 mm/s. Thereafter, the movable member 24 enters the resonant state at the driving frequency of about 62.5 kHz to accelerate its moving speed to about 15.2 mm/s. The moving speed is substantially constant at about 11.4 mm/s while the driving frequency changes from about 65 kHz to about 69 kHz and then decelerated to about 9.1 mm/s. From this stage on, the moving speed is constant at about 11.0 mm/s, despite a small variation, up to the driving frequency of about 89.8 kHz. Then, the movable member 24 enters the resonance state at the driving frequency of about 93.5 kHz to accelerate its moving speed to about 11.8 kHz mm/s, and the moving speed becomes 0 mm/s at the driving frequency of about 98 kHz. The change of the moving speed in relation to the driving frequency is substantially same in the forward and reverse directions although the moving speed is faster in the reverse direction than in the forward direction.

The case where the duty ratio D is 2:8 is described. As can be seen from FIG. 7, the driving device 10 used in this analysis can drive the movable member 24 at the driving frequency at least between 50 kHz and about 74 kHz and between about 86 kHz and about 90 kHz. In this case, the resonant state and the nonresonant state are even more unclear as compared to the case where the duty ratio is 3:7. Specifically, the moving speed of the movable member 24 changes substantially along an inverted U-shaped trace accompanied by a slight variation as the driving frequency changes from 50 kHz to about 71 kHz, and peaks at about 10.7 mm/s when the driving frequency is 61 kHz. The moving speed of the movable member 24 becomes 0 mm/s when the driving frequency is about 71 kHz, peaks at about 5 mm/x when the driving frequency is about 72.5 kHz and becomes 0 mm/s when the driving frequency is about 74 kHz. Thereafter, the moving speed continues to be 0 mm/s until the driving frequency becomes about 86 kHz, peaks at about 4.3 mm/s when the driving frequency is about 88 kHz, and becomes 0 mm/s again when the driving frequency is about 90 kHz. The change of the moving speed in relation to the driving frequency is substantially same in the forward and reverse directions although the moving speed is faster in the reverse direction than in the forward direction.

As can be seen from FIG. 7, the moving speed of the movable member 24 changes substantially linearly in relation to the duty ratio D at the driving frequencies between about 60 kHz and about 65 kHz. For example, at the driving frequency of 62 kHz, the moving speed changes substantially linearly from about 10 mm/s to about 15 mm/s to about 19.0 mm/s as the duty ratio D is changed from 2:8 to 2.5:7.5 to 3:7.

Accordingly, the duty ratio look-up table is generated by actually measuring the relationship between the moving speed of the movable member 24 and the duty ratio D of the drive voltage in a specified load condition attained by placing the drivable object 30 on the movable member 24. Then, the driving frequency at which the moving speed of the movable member 24 changes substantially linearly in relation to the duty ratio D is checked and determined as a basic driving frequency, and the relationship between the moving speed of the movable member 24 and the duty ratio D of the drive voltage at this driving frequency is adopted. For example, if the basic driving frequency is 62 kHz, the duty ratio look-up table is generated such that (10 mm/s, 2:8), (15 mm/s, 2.5:7.5) and (19 mm/s, 3:7) when it is written in (speed, duty ratio).

(Generation of the Frequency Look-Up Table)

As can be seen from FIGS. 5 and 7, the moving speed of the movable member 24 is a function of the driving frequency. Thus, the moving speed can be controlled by shifting (changing) the frequency from the basic driving frequency. In view of a feedback servo to be performed, it is desirable that the moving speed changes to a small degree in relation to a frequency change. Accordingly, if, for example, the duty ratio D of the drive voltage is 3:7 in the forward direction and 7:3 in the reverse direction and the basic driving frequency is 58 kHz, the frequency look-up table is generated such that (3.5 mm/s, 50 kHz) and (17 mm/s, 60 kHz) when it is written in (speed, frequency). It should be noted that the frequency look-up table may be generated using differences from the basic driving frequency and written in (3.5 mm/s, −8 kHz) and (17 mm/s, +2 kHz).

Next, the operation of the driving device 10 is described. In the case that the moving speed of the movable member 24 is controlled based on the voltage value of the drive voltage, the basic driving frequency and the voltage look-up table are saved in the ROM of the control circuit 26.

The control circuit 26 judges the present position of the movable member 24 from a signal inputted from the member sensor 27 when a target speed and a target position are given from an external signal. Subsequently, the control circuit 26 compares the present position and the target position to thereby judge whether or not the movable member 24 is to be moved in the forward direction or in the reverse direction. The control circuit 26 sets the duty ratio D at 3:7 if the movable member 24 is judged to be moved in the forward direction while setting the duty ratio D at 7:3 if the movable member 24 is judged to be moved in the reverse direction. The control circuit 26 then judges a voltage value corresponding to the target speed with reference to the voltage look-up table. Subsequently, the control circuit 26 outputs a control signal to the driving circuit 25 to control the driving circuit 25 such that the basic driving frequency, the set duty ratio D and the judged voltage value can be attained. As a result, the driving circuit 25 applies a control drive voltage to the electromechanical conversion element 21 in accordance with the received control signal, whereby the movable member 24 is moved toward the target position at the target speed. Then, the control circuit 26 receives a signal from the member sensor 27 again to obtain the present position of the movable member 24. Subsequently, the control circuit 26 outputs a control signal to the driving circuit 25 to stop the driving circuit 25 if the present position coincides with the target position while executing the above control unless the present position coincides with the target position. In this way, the movable member 24 is moved at the target speed with reference to the voltage look-up table and moved to the target position by performing a feedback control.

In the case that the moving speed of the movable member 24 is controlled based on the duty ratio D of the drive voltage, the basic driving frequency, the voltage value of the drive voltage and the duty ratio look-up table are saved in the ROM of the control circuit 26.

The control circuit 26 judges the duty ratio D corresponding to the target speed with reference to the duty ratio look-up table when the target speed and the target position are given from an external signal. Then, the control signal judges the present position of the movable member 24 from a signal inputted from the member sensor 27. Subsequently, the control circuit 26 compares the present position and the target position to thereby judge whether or not the movable member 24 is to be moved in the forward direction or in the reverse direction. The control circuit 26 determines the duty ratio D based on the judged duty ratio D and moving direction. For example, in the case that the duty ratio D is judged to be 2:8, the control circuit 26 sets the duty ratio D of the drive voltage at 2:8 if the movable member 24 is to be moved in the forward direction while setting it at 8:2 if the movable member 24 is to be moved in the reverse direction. Subsequently, the control circuit 26 outputs a control signal to the driving circuit 25 to control the driving circuit 25 such that the basic driving frequency, the voltage value and the set duty ratio D can be attained. As a result, the driving circuit 25 applies a control drive voltage to the electromechanical conversion element 21 in accordance with the received control signal, whereby the movable member 24 is moved toward the target position at the target speed. Then, the control circuit 26 receives a signal from the member sensor 27 again to obtain the present position of the movable member 24. Subsequently, the control circuit 26 outputs a control signal to the driving circuit 25 to stop the driving circuit 25 if the present position coincides with the target position while executing the above control unless the present position coincides with the target position. In this way, the movable member 24 is moved at the target speed with reference to the duty ratio look-up table and moved to the target position by performing a feedback control.

In the case that the moving speed of the movable member 24 is controlled based on the frequency of the drive voltage, the basic driving frequency, the duty ratio D, the voltage value and the frequency look-up table are saved in the ROM of the control circuit 26.

The control circuit 26 judges the present position from a signal inputted from the member sensor 27 the target speed and the target position are given from an external signal. Then, the control circuit 26 compares the present position and the target position to thereby judge whether or not the movable member 24 is to be moved in the forward direction or in the reverse direction. The control circuit 26 sets the duty ratio D based on a judgment result. The control circuit 26 then judges the driving frequency corresponding to the target speed with reference to the frequency look-up table. Subsequently, the control circuit 26 outputs a control signal to the driving circuit 25 to control the driving circuit 25 such that the driving frequency, the set duty ratio D and the judged voltage value can be attained. If the frequency look-up table is generated using the differences between the basic driving frequency and the driving frequencies, the control circuit 26 changes the basic driving frequency only by the difference, and outputs a control signal to the driving circuit 25 to control the driving circuit 25 such that the set duty ratio D and the judged voltage value can be attained. As a result, the driving circuit 25 applies a control drive voltage to the electromechanical conversion element 21 in accordance with the received control signal, whereby the movable member 24 is moved toward the target position at the target speed. Then, the control circuit 26 receives a signal from the member sensor 27 again to obtain the present position of the movable member 24. Subsequently, the control circuit 26 outputs a control signal to the driving circuit 25 to stop the driving circuit 25 if the present position coincides with the target position while executing the above control unless the present position coincides with the target position. In this way, the movable member 24 is moved at the target speed with reference to the frequency look-up table and moved to the target position by performing a feedback control.

As described above, the movable member 24 can be efficiently driven while maintaining the resonant state since the driving device 10 of this embodiment sets the frequency of the drive voltage at the basic driving frequency. Further, since the driving device 10 of this embodiment adjusts one of the voltage value, the duty ratio D and the driving frequency specifying the drive voltage as a maneuverable physical quantity, the moving speed of the movable member 24 can be set at a specified value. Furthermore, the driving device 10 of this embodiment can also control the position of the movable member 24 by the feedback control.

The driving device 10 used in the above experiments can be used in an apparatus as it is by saving the look-up tables generated based on the results analyzed for the drivable object 30 in the ROM of the control circuit 26 and adapting the operation program to the apparatus in which the driving device 10 is to be installed.

Next, another embodiment of the present invention is described. In the second embodiment, the driving device described in the earlier embodiment is used as a driving device for driving a camera shake correction lens, and a voltage value of a drive voltage is a maneuverable physical quantity.

Figure 8:
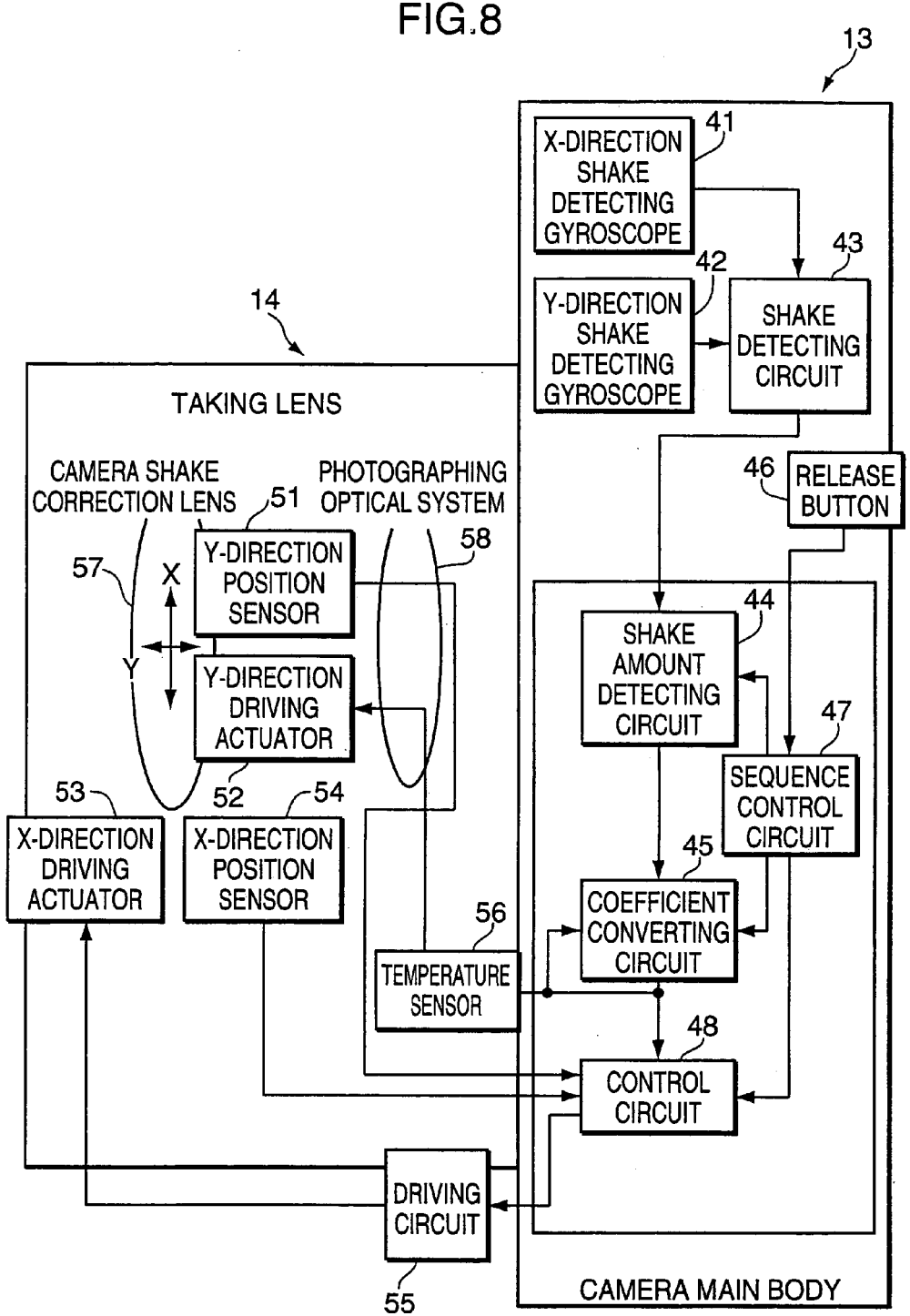
FIG. 8 is a block diagram schematically showing a construction of a camera capable of camera shake correcting function according to another embodiment of the present invention.

FIG. 8 is a block diagram schematically showing a construction of a camera provided with a camera shake correcting function according to the second embodiment.

In FIG. 8, the camera provided with the camera shake correcting function according to the second embodiment is provided with a camera main body 13 and a taking lens 14. The camera main body 13 includes an X-direction shake detecting gyroscope 41, a Y-direction shake detecting gyroscope 42, a shake detecting circuit 43, a shake amount detecting circuit 44, a coefficient converting circuit 45, a release button 46, a sequence control circuit 47 and a control circuit 48. The taking lens 14 includes a Y-direction position sensor 51, a Y-direction driving actuator 52, an X-direction position sensor 53, an X-direction driving actuator 54, a driving circuit 55, a temperature sensor 56, a camera shake correction lens 57 and a photographing optical system 58.

First, the camera main body 13 is described. The X-direction shake detecting gyroscope 41 is a gyroscopic sensor for detecting an X-direction shake of the camera. The Y-direction shake detecting gyroscope 42 is a gyroscopic sensor for detecting a Y-direction shake of the camera. The gyroscopic sensor detects an angular velocity of the shake when an object to be measured (camera in this embodiment) is rotated by shaking. X-direction and Y-direction are normal to each other.

An X-direction shake angular velocity signal detected by the X-direction shake detecting gyroscope 41 and a Y-direction shake angular velocity signal detected by the Y-direction shake detecting gyroscope 42 are inputted to the shake detecting circuit 43. The shake detecting circuit 43 is comprised of a filter circuit (low-pass filter and high-pass filter) for reducing a noise and a drift of each angular velocity signal, and an integrating circuit for converting the respective angular velocity signals into angle signals.

Each angle signal outputted from the shake detecting circuit 43 is inputted to the shake amount detecting circuit 44. The shake amount detecting circuit 44 receives the respective angle signals at a specified time interval and outputs X-direction and Y-direction shake amounts of the camera as detx and dety to the coefficient converting circuit 45, respectively.

The coefficient converting circuit 45 converts the shake amounts (detx, dety) of the respective directions into target positions (px, py) of the respective directions while correcting them in accordance with a solid variation of the camera shake correction lens 57 and an ambient temperature. The solid variation of the camera shake correction lens 57 is saved in a memory (not shown) installed in the camera main body 13. For example, actually measured values obtained by a test at the time of the shipment of the camera main body are saved. A temperature characteristic is also saved in this memory by, for example, actually measuring.

Signals outputted from the coefficient converting circuit 45 and representing the target positions (px, py) of the respective directions and the driving frequency are inputted to the control circuit 48. The control circuit 48 calculates a voltage value with reference to a voltage look-up table to be described later in order to control a moving speed such that the camera shake correction lens 57 can be moved to the target positions (px, py) of the respective directions renewed at a specified time interval. The voltage look-up table is saved in the aforementioned memory. The control circuit 48 calculates a driving frequency and a duty ratio as described later and outputs them as control signals together with the calculated voltage value to the driving circuit 55 of the taking lens 14.

The operations of the shake amount detecting circuit 44, the coefficient converting circuit 45 and the control circuit 48 are controlled by the sequence control circuit 47. Specifically, the sequence control circuit 47 obtains the shake amounts (detx, dety) of the respective directions by controlling the shake amount detecting circuit 44 when the release button 46 is fully pressed (S11). Subsequently, the sequence control circuit 47 controls the coefficient converting circuit 45 to thereby convert the shake amounts of the respective directions into the target positions (px, py) of the respective directions (S12). Then, the sequence control circuit 47 controls the control circuit 48 to thereby calculate an operation value based on the target positions of the respective directions and the driving frequency (S13). The operations of S11 to S13 are repeated at a specified time interval during a period lasting until an exposure is completed after the release button 46 is fully pressed in order to correct the camera shake. The shake of the camera, i.e., so-called camera shake is said to be a vibration obtained by combining a muscular vibration having a small amplitude of about 10 Hz, a body shake having a large amplitude of 3 Hz or lower, and a shake caused upon operating the release button 46 and having a large amplitude of about 5 Hz. Thus, the camera shake correction is performed at an interval of, e.g., 0.0005 secs. (2 kHz) in this embodiment.

The sequence control circuit 47 performs a photographing preparation including a light measurement and an object distance detection using unillustrated circuits when the release button 46 is pressed halfway, whereas it performs photographing, for example, by driving a focusing lens when the release button 46 is fully pressed.

Next, the taking lens 14 is described. The temperature sensor 56 is, for example, a thermistor, and detects an ambient temperature and outputs a detection result to the coefficient converting circuit 45 and the control circuit 48 of the camera main body 13. The detection result is used to correct changes in the characteristics caused by a temperature change. For example, such corrections include corrections of the camera shake correction lens 57 and the position sensors 51, 54 in relation to a temperature change, and corrections of the basic driving frequency and the drive voltage of the respective actuators 52, 53. These corrections are made using look-up tables saved in advance in the aforementioned memory (not shown) in the camera main body 13 and defining correction values in relation to the temperature for the respective characteristics.

The photographing optical system 58 focuses an object light from an object on a sensing surface. The camera shake correction lens 57 is a lens for correcting the camera shake.

The Y-direction position sensor 51 detects the position of the camera shake correction lens 57 along Y-direction and outputs a detection result to the driving circuit 55. The Y-direction driving actuator 52 is an impact type piezoelectric actuator and moves the camera shake correction lens 57 along Y-direction in accordance with the drive voltage outputted from the driving circuit 55. The X-direction position sensor 54 detects the position of the camera shake correction lens 57 along X-direction and outputs a detection result to the driving circuit 55. The X-direction driving actuator 53 is an impact type piezoelectric actuator and moves the camera shake correction lens 57 along X-direction in accordance with the drive voltage outputted from the driving circuit 55.

The Y-direction and X-direction position sensors 51, 54 are, for example, constructed such that an infrared light-emitting diode (IRED) and a slit are arranged at a movable side and a position sensor or PSD (Position Sensitive Device) is arranged at a fixed side. Outputs of the respective position sensors 51, 54 are inputted to the control circuit 48. The driving circuit 55 supplies drive voltages to the Y-direction and X-direction driving actuators 52, 53 as described later in accordance with a control signal outputted from the control circuit 48 of the camera main body 13. Here in the second embodiment, the driving circuit 55 used is, for example, the driving circuit described in this embodiment and shown in FIGS. 3 and 13 to be described later.

Figure 9:
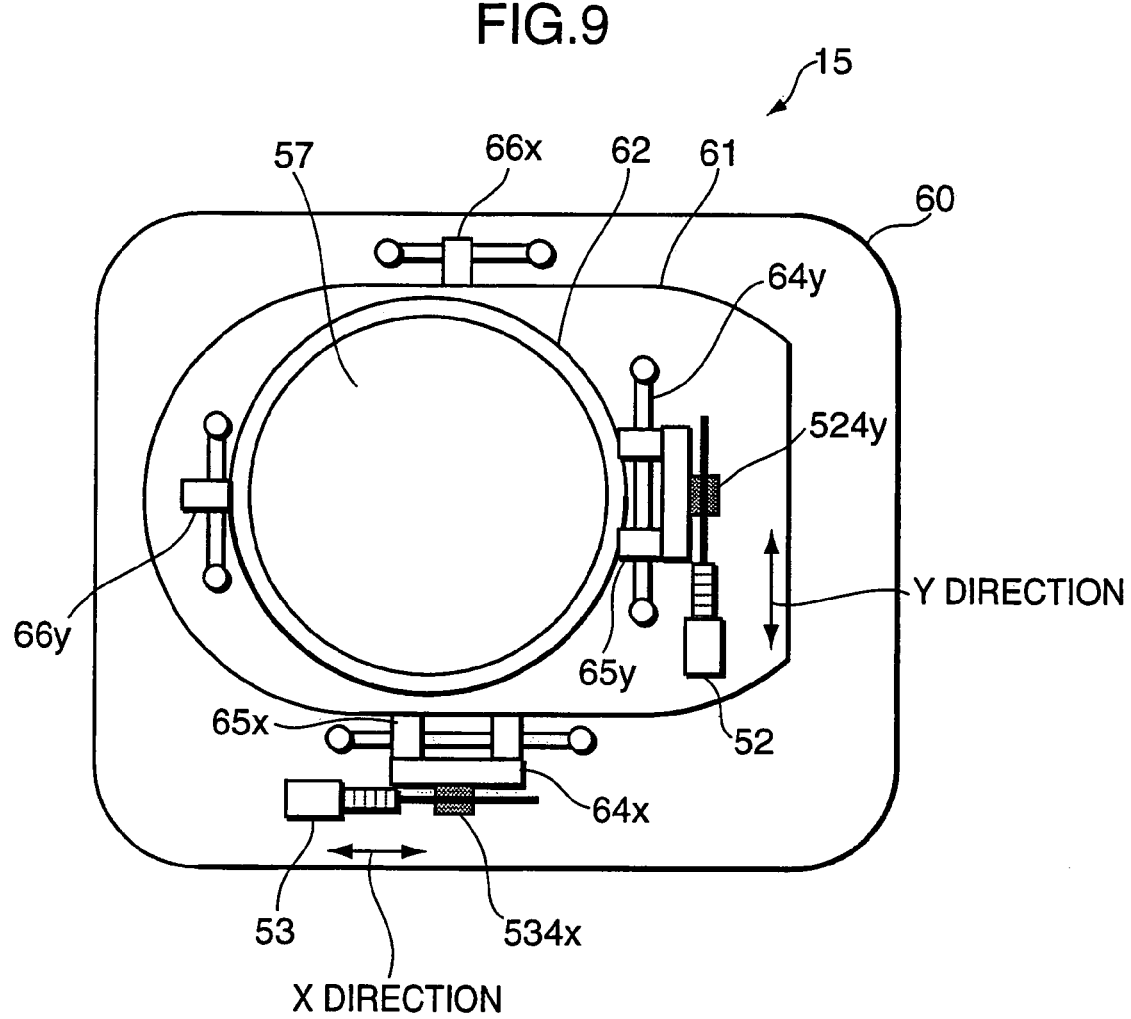
FIG. 9 is a diagram schematically showing a construction of a camera shake correction lens unit.

Next, the construction of a camera shake correction lens unit 15 is described. FIG. 9 is a diagram schematically showing a construction of the camera shake correction lens unit 15.

In FIG. 9, the camera shake correction lens unit 15 is provided with the Y-direction driving actuator 52, the X-direction driving actuator 53, the camera shake correction lens 57, a base 60, a base plate 61, a lens frame 62, a Y-direction slide shaft 64y, an X-direction slide shaft 64x, a Y-direction slide guide 65y, an X-direction slide guide 65x, a Y-direction auxiliary guide 66y and an X-direction auxiliary guide 66x.

The base 60 is a member on which the respective elements of the camera shake correction lens unit 15 are mounted. The base 60 is fixed to a barrel of the taking lens 14. The X-direction driving actuator 53 is, for example, the impact type piezoelectric actuator 11 having an element fixing construction shown in FIG. 2, and is mounted by being fixed to one side of the base 60. A direction along which a movable member 534x (corresponding to the movable member 24 of FIG. 2) of the X-direction driving actuator 53 is referred to as X-direction.

The X-direction slide guide 65x is a substantially U-shaped torque transmitting member having a pair of projection-shaped sliders at the opposite ends of a base portion. The base portion of the X-direction slide guide 65x is secured to the movable member 534x, and one end of each slider is secured to the base portion while the other end thereof is secured to the base plate 61. Each slider is formed with a hole through which the X-direction slide shaft 64x is introduced so as to be movable along the X-direction slide shaft 64x. The X-direction slide shaft 64x has the opposite ends thereof secured to the base 60 while being spaced apart from the base 60 so that the X-direction slide guide 65x is movable along the X-direction slide shaft 64x. On the other hand, a slider of the X-direction auxiliary guide 66x is secured to the base plate 61 at a side opposite from the one where the X-direction slide guide 65x is secured. The X-direction auxiliary guide 66x is comprised of the slider and a slider shaft. The slider of the X-direction auxiliary guide 66x is formed with a hole through which the slider shaft is introduced, and this slider shaft has the opposite ends thereof secured to the base 60 while being spaced apart from the base 60 so that the slider is movable along the slider shaft. Thus, the X-direction auxiliary guide 66x assists the X-direction slide guide 65x so that the base plate 61 smoothly moves along X-direction and supports the base plate 61 lest the base plate 61 should be inclined toward a direction of an optical axis.

The Y-direction driving actuator 52 is, for example, the impact type piezoelectric actuator 11 having an element fixing construction shown in FIG. 2, and is mounted by being so fixed to one side of the base 60 as to be normal to X-direction. The Y-direction slide guide 65y is a substantially U-shaped torque transmitting member having a pair of projection-shaped sliders at the opposite ends of a base portion. The base portion of the Y-direction slide guide 65y is secured to the movable member 524y (corresponding to the movable member 24 of FIG. 2), and one end of each slider is secured to the base portion while the other end thereof is secured to the lens frame 62. Each slider is formed with a hole through which the Y-direction slide shaft 64y is introduced so as to be movable along the Y-direction slide shaft 64y. The Y-direction slide shaft 64y has the opposite ends thereof secured to the base plate 61 while being spaced apart from the base plate 61 so that the Y-direction slide guide 65y is movable along the Y-direction slide shaft 64y. On the other hand, a slider of the Y-direction auxiliary guide 66y is secured to the lens frame 62 at a side opposite from the one where the Y-direction slide guide 65y is secured. The Y-direction auxiliary guide 66y is comprised of the slider and a slider shaft. The slider of the Y-direction auxiliary guide 66y is formed with a hole through which the slider shaft is introduced, and this slider shaft has the opposite ends thereof secured to the base plate 61 while being spaced apart from the base plate 61 so that the slider is movable along the slider shaft. Thus, the Y-direction auxiliary guide 66y assists the Y-direction slide guide 65y so that the lens frame 62 smoothly moves along Y-direction and supports the lens frame 62 in such a manner as not to be inclined toward the direction of the optical axis. The lens frame 62 is a holding member for holding the camera shake correction lens 57.

By taking the above construction, the camera shake correction lens 57 causes the object light to refract in the respective directions while being continuously controlled to pursue along X-direction and Y-direction in an optimal controlled (speed) state in accordance with a position servo control by the control circuit 48. As a result, the camera shake can be corrected.

Figure 10:
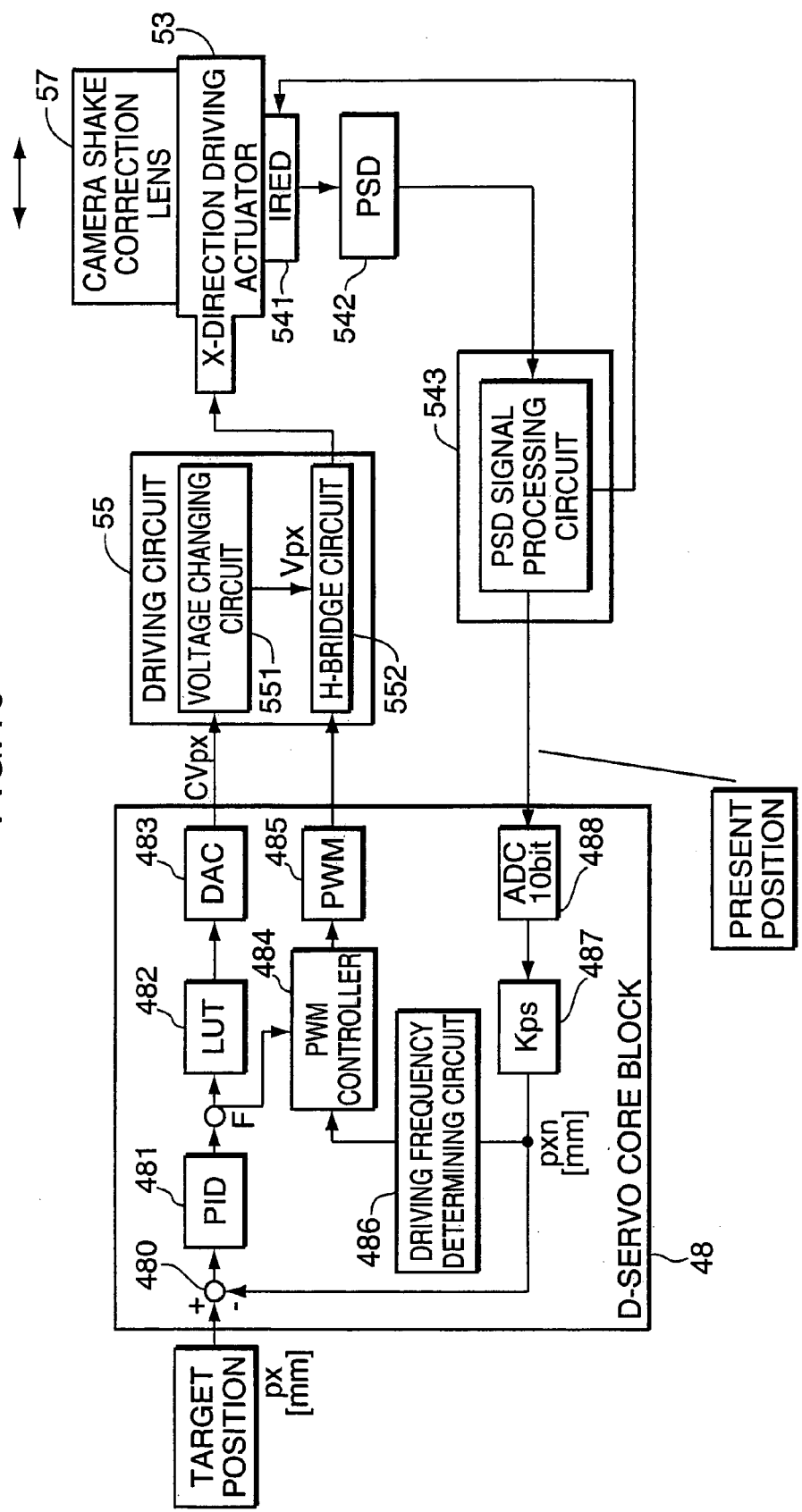
FIG. 10 is a block diagram showing a construction of a control circuit and its peripheral circuits.

Next, the control circuit and its peripheral circuits are described. FIG. 10 is a block diagram showing constructions of the control circuit 48 and its peripheral circuits. Since the camera shake is corrected along X-direction and Y-direction, a construction for controlling the X-direction driving actuator 53 and the one for controlling the Y-direction driving actuator 52 are necessary. Since these constructions are same, the construction for controlling the X-direction driving actuator 53 is shown in FIG. 10 and the one for controlling the Y-direction driving actuator 52 is left out. In the description below as well, no description is given on the construction for controlling the Y-direction driving actuator 52.

In FIG. 10, the control circuit 48 is provided with a subtracting circuit 480, a PID 481, a look-up table circuit 482, a digital-to-analog (D/A) converter 483, a PWM controller 484, a PWM circuit 485, a driving frequency determining circuit 486, a unit converting circuit 487 and an analog-digital (A/D) converter 488. The driving circuit 55 is provided with a voltage changing circuit 551 and an H-bridge circuit 552. The X-direction position sensor 54 is provided with an IRED 541, a PSD 542 and a PSD signal processing circuit 543.

An infrared ray of the IRED 541 mounted on the movable member of the X-direction driving actuator 53 is incident on the PSD 542 via a slit. The PSD 542 detects this infrared ray and outputs a detection result to the PSD signal processing circuit 543. The PSD signal processing circuit 543 processes the detection result into such an analog voltage representing a present position pxn of the movable member, i.e., the present position pxn of the camera shake correction lens 57, and outputs this analog voltage to the A/D converter 488 of the control circuit 48.

The A/D converter 488 is an analog-to-digital converting circuit and converts the analog signal representing the present position pxn of the camera shake correction lens 57 into a 10-bit digital signal and outputs it to the unit converting circuit 487. The unit converting circuit 487 multiplies the signal representing the present position and converted into the digital signal by a constant (× Kps) so as to be the same unit as the target position px inputted from the coefficient converting circuit 45. The present-position representing signal multiplied by Kps is inputted to the driving frequency determining circuit 486 and the subtracting circuit 480 to which the signal representing the target position px is inputted.

The driving frequency determining circuit 486 calculates the driving frequency based on the basic driving frequency of the actuator which is a driving frequency under a specific condition, in consideration of the solid variation and the temperature characteristic of the camera shake correction lens 57. Specifically, the driving frequency determining circuit 486 calculates the driving frequency by correcting the basic driving frequency in accordance with the solid variation of the camera shake correction lens 57 and the ambient temperature. The solid variation of the camera shake correction lens 57 at the driving frequency is saved in the aforementioned memory (not shown) installed in the camera main body 13. For example, correction values actually measured in a test at the time of the shipment of the camera main body are saved in this memory. Correction values of the basic driving frequency for the respective temperatures are saved as a temperature correction table by also actually measuring the temperature characteristic of the driving frequency. A signal representing the driving frequency calculated by the driving frequency determining circuit 486 is inputted to the PWM controller 484. Since the basic driving frequency is corrected by the driving frequency determining circuit 486, a suitable basic driving frequency can be set even in the case that the camera shake correction lens 57 experiences a solid variation or a temperature change.

On the other hand, the signal representing the target position px and inputted from the coefficient converting circuit 45 to the control circuit 48 is subtracted by the signal representing the present position pxn in the subtracting circuit 480. A control difference signal obtained by this subtraction is inputted to the PID 481, which determines a proportional, differential and integral gains for a difference between the target position px and the present position pxn so as to make this difference an optimal operation value. The control difference signal amplified by these gains is inputted from the PID 481 to the look-up table circuit 482 and the PWM controller 484.

Figure 11:
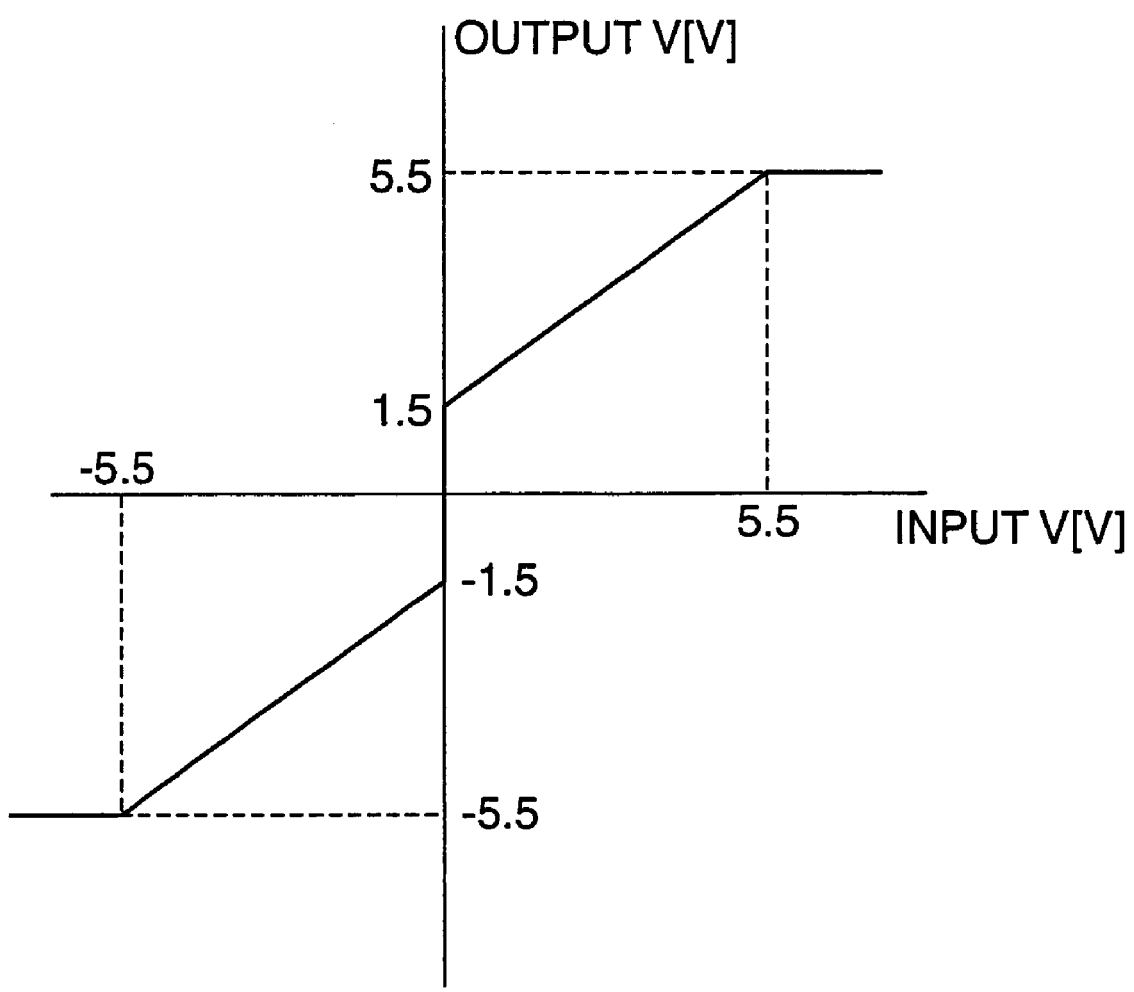
FIG. 11 is a graph showing one exemplary characteristic formatted into a look-up table.

The look-up table circuit 482 determines a voltage value of a dc supply voltage Vp of the drive voltage in accordance with the control difference signal with reference to the voltage look-up table in the memory. The determined voltage value of the drive voltage is inputted to the D/A converter 483. Here, the look-up table circuit 482 sets a nonlinear gain difficult to set by a proportional gain, a differential gain (gain of high-frequency components), etc. For example, in the case of this driving device, 1.5 V is outputted even if the control value of 0 to 1.5 V is inputted in order to deal with a dead band in which the driving device does not operate due to friction despite the application of a voltage of 0 to 1.5 V, and a maximum value of the applied voltage is restricted to avoid an unnecessarily high temperature of the driving device in order to ensure a durability for the driving device. This look-up table is generated to define, for example, a characteristic shown in FIG. 11. Specifically, this look-up table is generated such that an output voltage is constantly −5.5 V if an input voltage is −5.5 V or below; has such a proportional relationship defined by (output voltage)=(4/5.5)×(input voltage)−1.5 if the input voltage is between −5.5 and 0 V; has such a proportional relationship defined by (output voltage)=(4/5.5)×(input voltage)+1.5 if the input voltage is between 0 and 5.5 V; and is constantly 5.5 V if the input voltage is 5.5 V or higher.

The D/A converter 483 is an digital-to-analog converting circuit, and converts the voltage value of the drive voltage into a 8-bit analog voltage and outputs it to the driving circuit 55. Thus, in the case that the driving circuit is a circuit shown in FIG. 13, the dc supply voltage Vp is changed to a voltage value of the drive voltage determined by the look-up table circuit 482. Therefore, the movable member, i.e., the camera shake correction lens 57 is continuously moved at a specified time interval so as to correct the camera shake while an exposure is made for an object image.

The PWM controller 484 determines the moving direction of the camera shake correction lens 57 in accordance with the (+) or (−) sign of the control difference signal from the PID 481, and sets the duty ratio D at 3:7 in the case of the forward direction while setting it at 7:3 in the case of the reverse direction. To the PWM circuit 485, the PWM controller 484 outputs such a control signal as to create a rectangular-wave voltage at the driving frequency calculated by the driving frequency determining circuit 486 and at the set duty ratio D. The PWM circuit 485 creates the rectangular wave drive voltage in this state and supplies it to the H-bridge circuit 552 of the driving circuit 55. The circuit shown in FIG. 3 or 13 is, for example, used as the H-bridge circuit 552.

The electromechanical conversion element of the X-direction driving actuator 53 is driven by this H-bridge circuit 552, and the X-direction driving actuator 53 moves the camera shake correction lens 57 toward the target position at a specified speed. For a difference between the latest target position xp and the present position xpn, then, the control circuit 48 applies an optimal voltage in the PID circuit 481, the look-up table circuit 482 and the D/A converter 484, and continuously drives the camera shake correction lens 57 by continuing to supply an optimal drive pulse signal to the H-bridge circuit 552 from the driving frequency determining circuit 486, the PWM controller 484 and the PWM circuit 485. Thus, the camera shake can be continuously corrected while an exposure is made.

Next, the operation of the camera provided with the camera shake correcting function is described. When a photographer fully presses the release button 46, the sequence control circuit 47 causes the shake amount detecting circuit 44 and the coefficient converting circuit 45 to converts the angular velocities of the respective directions detected by the X-direction and Y-direction shake detecting gyroscopes 41, 42 into signals representing the target positions (px, py) of the respective directions to which the camera shake correction lens 57 should be moved and to output them to the control circuit 48.

Since the X-direction driving actuator 53 and the Y-direction driving actuator 52 operate in the same manner, only the operation of the X-direction driving actuator 53 is described below.

The control circuit 48 obtains a signal representing the present position pxn of the camera shake correction lens 57 from the X-direction position sensor 54. The signal representing the present position pxn is converted into a digital signal by the A/D converter 488 and has its unit converted into the same unit as a signal representing the target position px in the unit converting circuit 487. The converted signal representing the present position pxn is inputted to the driving frequency determining circuit 486 and the subtracting circuit 480 for subtracting this signal from the signal representing the target position px.

The subtracting circuit 480 generates a control difference signal by subtracting the present position pxn from the target position px, and this control difference signal is outputted to the look-up table circuit 482 and the PWM controller 484 after the above processing is applied thereto in the PID 481. The look-up table circuit 482 determines a voltage value Vpx of the drive voltage with reference to the voltage look-up table in accordance with the control difference signal. The determined voltage value Vpx is inputted to the voltage changing circuit 551 of the driving circuit 55 after being converted into an analog signal in the D/A converter 483, and the value of the dc supply voltage of the driving circuit 55 is set at the voltage value Vpx.

On the other hand, the driving frequency determining circuit 486 is triggered by the input of the signal representing the present position pxn and judges a correction value corresponding to a detected ambient temperature with reference to the temperature correction table saved in the unillustrated memory in accordance with the ambient temperature detected by the temperate sensor 56. The driving frequency determining circuit 486 determines the driving frequency by correcting the basic driving frequency saved in the above memory by the correction value for the solid variation and the one for the ambient temperature which values are saved in this memory. It is not always necessary to determine the driving frequency for each feedback position servo control of the camera shake. The driving frequency may be determined only at the time of activating the camera or once every several position servo controls.

The signal representing the determined driving frequency is inputted to the PWM controller 484 together with an output of the PID 481. The PWM controller 484 judges the moving direction of the movable member 24, i.e., of the camera shake correction lens 57 based on the (+) or (−) sign of the output of the PID 481, and determines the duty ratio D based on this judgment result. Specifically, the PWM controller 484 sets the duty ratio D at 3:7 in the case of the forward direction while setting it at 7:3 in the case of the reverse direction. The PWM controller 484 controls the PWM circuit 485 to feed a PWM signal representing the corrected driving frequency and the determined duty ratio D to the H-bridge circuit 552 of the driving circuit 55. The H-bridge circuit 552 drives the electromechanical conversion element 21 of the X-direction driving actuator 53 at the dc supply voltage set at Vpx in accordance with the PWM signal, whereby the movable member 24 is moved at a specified speed. In other words, the camera shake correction lens 57 is moved at the specified speed.

The control circuit 48 successively executes such a position control of the camera shake correction lens 57 at a specified time interval while an exposure is made for an object image. Specifically, the control circuit 48 determines an optimal control voltage from the latest target position px and the latest present position pxn, and repeatedly drives the X-direction driving actuator 53 at a speed corresponding to this voltage value. Here, the latest target position px is calculated from an output signal of the X-direction shake detecting gyroscope 41, and the latest present position pxn is obtained from an output signal of the X-direction position sensor 54. This position servo control is basically optimized such that the value of the voltage applied to the electromechanical conversion element of the X-direction driving actuator 53 increases to accelerate the driving speed when a position difference (difference between xp and xpn) and a speed difference are large. As a result, the camera shake correction lens 57 can be kept driven in such a state where the difference between the present position pxn and the target position px is small.

In this way, since the frequency of the drive voltage is set at the basic driving frequency in the second embodiment, it is not necessary to control the driving frequency in the case of controlling the speed and the position of the camera shake correction lens 57. Further, in the second embodiment, the driven state of the camera shake correction lens 57 can be optimized by adjusting the voltage value of the drive voltage, thereby performing a high-performance camera shake correction. Furthermore, since the impact-type piezoelectric actuator is used in the driving device for the camera shake correction lens 57 in the second embodiment, the taking lens 14 can be made smaller and more power saving. Therefore, the camera can be made smaller and more power saving.

Figure 12:
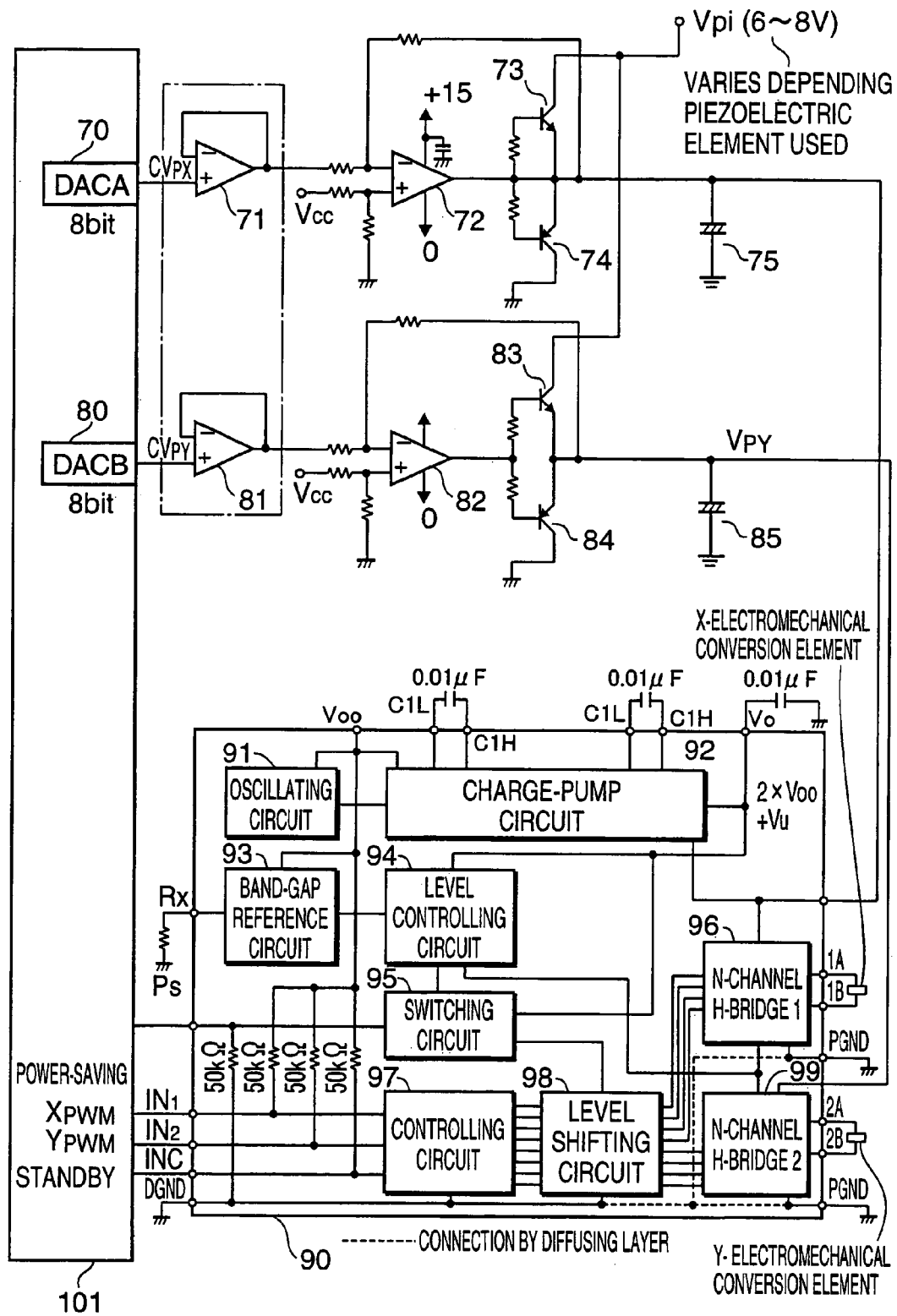
FIG. 12 is a circuit diagram showing a construction of a driving circuit of the camera.
Figures 13A, 13B, 13C, 13D:
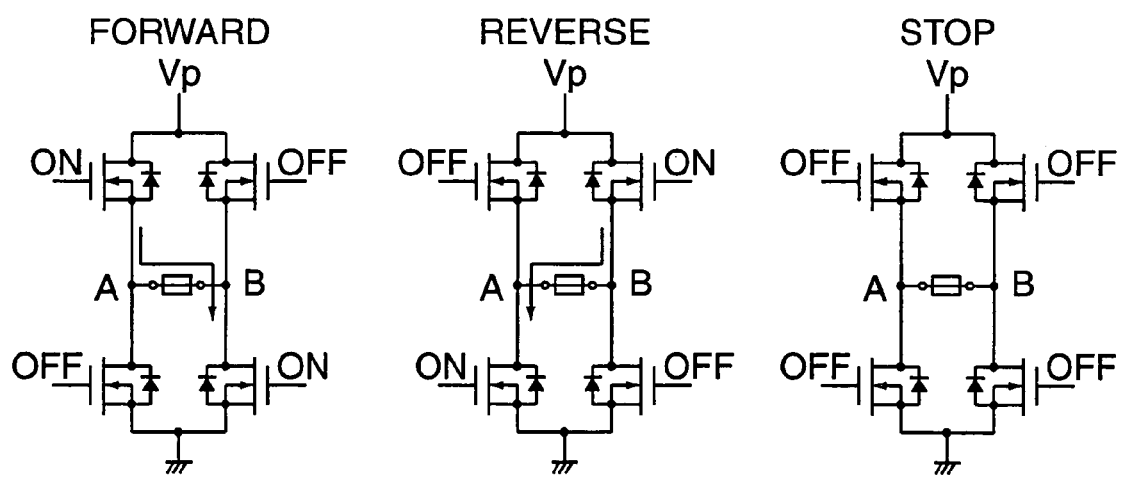
FIGS. 13A to 13D are diagrams of circuit controlled states showing a relationship between an n-channel H-bridge circuit and a voltage applied to an electromechanical conversion element.

Finally, one embodiment of the driving circuit 55 is shown in FIG. 12. FIG. 12 is a circuit diagram showing a construction of the driving circuit 55, and FIGS. 13A to 13D show a relationship between an n-channel H-bridge circuit and a voltage applied to the electromechanical element. FIG. 13A shows a relationship between the values of voltages applied to control terminals IN1, IN2, INC and voltage applying directions to the electromechanical conversion element, and FIGS. 13B to 13D show a relationship between on/off states of the respective switching elements of the H-bridge circuit and the moving directions of the movable member 24. FIG. 14A shows the value Vpx (Vp for driving in X-direction) of the voltage applied to the X-direction driving actuator, FIG. 14B shows a relationship between a PWM pulse Xpwm for driving the X-direction driving actuator and the voltage actually applied to the electromechanical conversion element. FIG. 14B(*a*) shows the value Vpx of the voltage applied to the X-direction driving actuator, FIG. 14B(*b*) shows the PWM pulse Xpwm for driving the X-direction driving actuator, and FIG. 14B(*c*) shows a voltage actually applied to the electromechanical conversion element.

In FIG. 12, a driver circuit 90 has two built-in H-bridge circuits 96, 99 for two channels, one of the two channels is a circuit in which a switching element forming the H-bridge circuit is an n-channel MOSFET. The H-bridge circuit 96 has a driving direction F/R controlled by H-level and L-level of the PWM pulse Xpwm inputted to the control terminal IN1 of the driver circuit 90, whereas the H-bridge circuit 99 has a driving direction F/R controlled by H-level and L-level of a PWM pulse Ypmw inputted to the control terminal IN2 of the driver circuit 90. Here, F denotes forward, i.e., the forward direction and R denotes reverse, i.e., the reverse direction.

The application of the voltage can be stopped by setting the control terminal INC of the driver circuit 90 at L-level. A control terminal PS of the driver circuit 90 is connected with a power-saving control terminal of a microcomputer and turns the circuits off at a timing at which the camera shake correcting function is not used.

The driver circuit 90 is also internally provided with a function block (oscillating circuit 91, charge-pump circuit 92, level controlling circuit 94, level shifting circuit 98, etc.) for boosting the voltage at the control terminal in the MOSFET for the level shift so as to enable the n-channel MOSFETs of the H-bridge circuits 96, 99 to be on/off controlled; and a SW control function block (switching circuit 95, controlling circuit 97) for on/off controlling the MOSFETs in accordance with output signals of the control terminals IN1, IN2, INC. Thus, the applied voltages in the X-direction driving actuator 53 and the Y-direction driving actuator 52 can be controlled even in the case that a voltage value from the microcomputer 101 is low and there are a small number of terminals for control signals.

The driver circuit 90 has a built-in band-gap reference circuit 93 for supplying a reference voltage to the oscillating circuit 91, the charge-pump circuit 92, the level controlling circuit 94 and the controlling circuit 97.

Voltages Vpx, Vpy are externally supplied to the driver circuit 90 to be actually applied to the electromechanical conversion element of the X-direction driving actuator 53 and that of the Y-direction driving actuator 52. A method for controlling this voltage supply is as follows. Voltages CVpx, Cvpy separately supplied for X-channel and Y-channel from DACA70, DACB80 which are D/A converters of the microcomputer 101 are introduced to differential amplifiers 72 to 74, 82 to 84 via buffer circuits 71, 81 for the level shift and the amplification factor conversion, thereby becoming optimal applied voltages Vpx, Vpy, which are then supplied to the electromechanical conversion element of the X-direction driving actuator 53 and that of the Y-direction driving actuator 52, respectively. A supply voltage Vpi is set at a constant value based on the capacity (size) of the electromechanical conversion elements used in the X-direction driving actuator 53 and the Y-direction driving actuator 52, and supplied from batteries, DC/DC converters or the like. For example, in the case of driving a camera lens, the supply voltage Vpi is preferably about 6 V to 8 V. Capacitors 75, 85 are for storing electric charges lest the applied voltages should largely change even if high-frequency rectangular-wave voltages of, e.g., about 60 kHz, are applied to the electromechanical conversion elements. In this embodiment, the capacitors 75, 85 preferably have a capacity of about 1 µF in consideration of a changing cycle (e.g., 1 kHz) of the applied voltages controlled by the microcomputer 101, a maximum voltage change amount and the capacity of the electromechanical conversion elements.

On the other hand, in FIG. 14A, in the case that an applied voltage control value is fixed at Vpx, the voltage actually applied to the electromechanical conversion element alternately takes values of Vpx and −Vpx since the driving direction F/R of the H-bridge circuit 96 changes in response to the H-level (Vcc) and L-level (GND) of the control terminal IN1.

FIG. 14B also simultaneously shows a change of Vpx at a rough time resolution. In response to a control for reversing the driving direction of the H-bridge circuit 96 of about 60 kHz, the voltage actually applied to the electromechanical conversion element is controlled by changing the applied voltage in a frequency of about 1 kHz (by renewing an optimal applied voltage). By this control, the electromechanical conversion element can have an average speed thereof controlled in a cycle of about 1 kHz while constantly resonating at an optimal resonance frequency (e.g., about 60 kHz). This control is repeatedly executed while the camera shake correction lens 57 is being driven.

Although the driving device has an element fixing construction in the foregoing embodiments, the present invention is also applicable to a case where the driving device has a mobile construction. The driving device having a mobile construction is disclosed in detail, for example, in Japanese Unexamined Patent Publications Nos. 2001-211669 and 2001-268951.

Further, although the control circuit 48 for controlling the Y-direction driving actuator 52 and the X-direction driving actuator 53 is provided in the camera main body 13 in the second embodiment, it may be provided in the taking lens 14. Then, the respective circuits for controlling the camera shake correction lens 57 can be deleted from the camera main body 13. Therefore, the camera main body 13 can be made smaller and produced at lower costs.

In this specification, in relation to a driving frequency and an amount of displacement, a normal state is a driven state at a certain driving frequency where a degree of displacement in response to a change in an input voltage is linear, and a resonant state is any driven state, including a mechanical resonant state, other than the normal state.

As described above, an inventive driving device for use with a ultrasonic actuator comprises: a position detector which detects a present position of a movable member driven by a ultrasonic actuator; a calculator which calculates a control target position of the movable member; a driver which generates such a drive voltage to drive the ultrasonic actuator in a specified resonant state; and a controller which controls an operative state of the movable member by adjusting at least one of physical quantities specifying the drive voltage as a maneuverable physical quantity in accordance with a difference between the present position and the control target position so that the movable member pursues the control target position.

The maneuverable physical quantity may be preferably a voltage value of the drive voltage or a frequency of the drive voltage.

The drive voltage may be preferably a rectangular wave and the maneuverable physical quantity is a duty ratio of the drive voltage.

The adjustment of the physical quantity may be preferably performed based on an adjustment value table.

The adjustment value table may be preferably stored in advance.

It may be preferable to further provide a temperature detector for detecting an ambient temperature for correction of the drive voltage.

Also, an inventive driving method for driving a ultrasonic actuator, comprises the steps: detecting a present position of a movable member driven by a ultrasonic actuator; calculating a control target position of the movable member; generating such a drive voltage to drive the ultrasonic actuator in a specified resonant state; and controlling an operative state of the movable member by adjusting at least one of physical quantities specifying the drive voltage as a maneuverable physical quantity in accordance with a difference between the present position and the control target position so that the movable member pursues the control target position.

Further, an inventive camera is provided with a camera shake correction lens provided in a photographing optical system of the camera; an ultrasonic actuator which drives the camera shake correction lens; a position detector which detects a present position of the camera shake correction lens; a calculator which calculates a control target position of the camera shake correction lens; a driver which generates such a drive voltage to drive the ultrasonic actuator in a specified resonant state; and a controller which controls an operative state of the camera shake correction lens by adjusting at least one of physical quantities specifying the drive voltage as a maneuverable physical quantity in accordance with a difference between the present position and the control target position so that the camera shake correction lens pursues the control target position.

The driving device and method, and the camera can efficiently drive an ultrasonic actuator by driving it in the specified resonant state. Since the driving device and method, and the camera can adjust at least one of the physical quantities specifying the drive voltage as a maneuverable physical quantity, the speed, acceleration or like operative state of the movable member or shake correction lens can be optimally adjusted while maintaining the resonant state. Thus, a position servo control can be continuously executed.

Since the inventive driving device sets the frequency of the drive voltage at the basic frequency, it is not necessary to control the frequency in the case that the maneuverable physical quantity is not the frequency. Further, since the inventive driving device adjusts at least one of the physical quantities specifying the drive voltage as a maneuverable physical quantity, the moving speed of the movable member can be set at a specified value. Particularly, in the case that the maneuverable physical quantity is not the frequency, one of the physical quantities specifying the drive voltage can be controlled independently of the driving frequency. Thus, the drive voltage can be easily controlled in the case of executing a speed control. Further, since the inventive driving device brings the electromechanical conversion element into the resonant state at the basic frequency, the electromechanical conversion element can be efficiently used and the position servo control can be executed for the moving state such as the speed or acceleration by controlling a maneuverable physical quantity (voltage, duty ratio D, or frequency shift) different from the optimal basic frequency. Thus, the inventive driving device can execute the position servo control while maintaining the resonant state and can servo-control the continuously changing position as in the camera shake correction.

Further, since the thus constructed driving device using the electromechanical conversion element can control the speed, the inventive driving device can be used in an apparatus in which a drivable object needs to be speed-controlled. Thus, this apparatus can be made smaller and more power saving.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A driving device for driving a movable member under position servo control by an ultrasonic actuator having characteristics that a moving speed of the movable member is varied substantially linearly by varying a non-frequency parameter, the device comprising:
   a position detector which detects a present position of the movable member driven by the ultrasonic actuator;
   a calculator which calculates a control target position of the movable member;
   a driver which generates a drive signal to drive the ultrasonic actuator in a specified resonant state; and
   a position servo controller which sets a basic driving frequency of the drive signal and controls said non-frequency parameter of the drive signal based on a difference between the present position and the control target position so that the movable member pursues the control target position.

2. A driving device according to claim 1, wherein said non-frequency parameter is a voltage value of the drive signal.

3. A driving device according to claim 1, wherein said non-frequency parameter is a duty cycle ratio of the drive signal.

4. A driving device according to claim 1, wherein the adjustment of said non-frequency parameter is performed based on an adjustment value table.

5. A driving device according to claim 4, wherein the adjustment value table is stored in advance.

6. A driving device according to claim 1, further comprising a temperature detector which detects an ambient temperature, wherein the basic driving frequency is corrected depending on the ambient temperature.

7. A driving device according to claim 1, wherein the ultrasonic actuator has driving frequency-speed characteristics that the speed is set at a substantially constant value in a predetermined frequency range.

8. A driving device according to claim 7, wherein said non-frequency parameter is a voltage value of the drive signal.

9. A driving device according to claim 7, wherein said non-frequency parameter is a duty ratio of the drive signal.

10. A driving device for driving a movable member under position servo control by an ultrasonic actuator having a resonant state in a constant amplitude state, the device comprising:
    a position detector which detects a present position of the movable member driven by the ultrasonic actuator;
    a calculator which calculates a control target position of the movable member;
    a driver which generates a drive signal to drive the ultrasonic actuator in a specified resonant state; and
    a position servo controller which sets a frequency of the drive signal to a frequency lower than a complete resonant frequency of the ultrasonic actuator, and which controls a first non-frequency parameter of the drive signal based on a difference between the present position and the control target position so that the movable member pursues the control target position.

11. A driving device according to claim 10, wherein the ultrasonic actuator has characteristics that a moving speed of the movable member is varied substantially linearly by changing a second non-frequency parameter.

12. A driving device according to claim 10, wherein the ultrasonic actuator has driving frequency-speed characteristics that the speed is set at a substantially constant value in a predetermined frequency range.

13. A driving device according to claim 10, wherein the control target position is continuously changed.

14. A driving device according to claim 10, wherein the calculator cyclically calculates the control target position at a predetermined cycle.

15. A driving device according to claim 10, wherein said first non-frequency parameter is a voltage value of the drive signal or a duty ratio of the drive signal.

16. A driving device for driving a movable member by an ultrasonic actuator under position servo control, the ultrasonic actuator being driven in a specified resonant state, and having characteristics that a moving speed of the movable member is varied substantially linearly by changing a non-frequency parameter, the device comprising:
   a position detector which detects a present position of the movable member driven by the ultrasonic actuator;
   a calculator which calculates a control target position of the movable member;
   a driver which generates a drive signal to drive the ultrasonic actuator in the specified resonant state; and
   a position servo controller which sets a basic driving frequency of the drive signal and controls said non-frequency parameter of the drive signal based on a difference between the present position and the control target position so that the movable member pursues the control target position, wherein a frequency of the drive signal is maintained within a predetermined frequency range.

17. A driving device according to claim 16, wherein the control target position is continuously changed.

18. A driving device according to claim 16, wherein the calculator cyclically calculates the control target position at a predetermined cycle.

19. A driving device according to claim 16, wherein the first non-frequency parameter is a voltage value of the drive signal or a duty ratio of the drive signal.

20. A driving device for driving a movable member by an ultrasonic actuator under position servo control,
   the ultrasonic actuator including:
      an electro-mechanical conversion element which is expandable and contractible by application of a drive signal;
      a supporting member which is fixed to an end of the electro-mechanical conversion element in an expanding/contracting direction thereof; and
      a driving member which frictionally engages the movable member, and is fixed to the other end of the electro-mechanical conversion element in the expanding/contracting direction thereof, the supporting member and the movable member being movable relative to each other by expanding and contracting the electro-mechanical conversion element at a variable speed, the driving device comprising:
   a position detector which detects a present position of the movable member driven by the ultrasonic actuator;
   a calculator which calculates a control target position of the movable member;
   a driver which generates the drive signal to drive the ultrasonic actuator in a specified resonant state; and
   a position servo controller which sets a basic driving frequency of the drive signal and controls a non-frequency parameter of the drive signal based on a difference between the present position and the control target position so that the movable member pursues the control target position.

21. A driving device according to claim 20, wherein the control target position is continuously changed.

22. A driving device according to claim 20, wherein the calculator cyclically calculates the control target position at a predetermined cycle.

23. A driving device according to claim 20, wherein said another parameter is a voltage value of the drive signal or a duty ratio of the drive signal.

24. A camera provided with a movable member driven under position servo control, the movable member being provided in a photographing optical system, the camera comprising:
   an ultrasonic actuator including:
      an electro-mechanical conversion element which is expandable and contractible by application of a drive signal;
      a supporting member which is fixed to an end of the electro-mechanical conversion element in an expanding/contracting direction thereof; and
      a driving member which frictionally engages the movable member, and is fixed to the other end of the electro-mechanical conversion element in the expanding/contracting direction thereof, the supporting member and the movable member being movable relative to each other by expanding and contracting the electro-mechanical conversion element at a variable speed,
   a position detector which detects a present position of the movable member driven by the ultrasonic actuator;
   a calculator which calculates a control target position of the movable member;
   a driver which generates the drive signal to drive the ultrasonic actuator in a specified resonant state; and
   a position servo controller which sets a basic driving frequency of the drive signal and controls a non-frequency parameter of the drive signal based on a difference between the present position and the control target position so that the movable member pursues the control target position.

25. A camera according to claim 24, wherein the movable member engages with a member for performing camera shake correction.

* * * * *